US012741476B2

(12) United States Patent
Billow et al.

(10) Patent No.: US 12,741,476 B2
(45) Date of Patent: Sep. 22, 2026

(54) SYSTEMS AND METHODS FOR IMPROVED PRINTING

(71) Applicant: DivergenTech LLC, Bow, NH (US)

(72) Inventors: Steven Billow, Bow, NH (US); Kenneth Stack, Ann Arbor, MI (US)

( * ) Notice: Subject to any disclaimer, the term of this patent is extended or adjusted under 35 U.S.C. 154(b) by 143 days.

(21) Appl. No.: 18/375,496

(22) Filed: Sep. 30, 2023

(65) Prior Publication Data

US 2024/0109356 A1 Apr. 4, 2024

Related U.S. Application Data

(60) Provisional application No. 63/412,095, filed on Sep. 30, 2022.

(51) Int. Cl.

*B41J 29/393* (2006.01)
*B41J 2/505* (2006.01)
*B41J 11/00* (2006.01)

(52) U.S. Cl.

CPC ........... *B41J 29/393* (2013.01); *B41J 2/5056* (2013.01); *B41J 11/0095* (2013.01); *B41J 2029/3935* (2013.01)

(58) Field of Classification Search

CPC ........ B41J 2/2132; B41J 29/38; B41J 11/008; B41J 11/0095; B41J 29/393; B41J 2/5056; B41J 2029/3935

See application file for complete search history.

(56) References Cited

U.S. PATENT DOCUMENTS 6,099,108 A 8/2000 Weber et al.
6,623,894 B2 9/2003 Pierson
6,659,589 B2 12/2003 Hickman et al.
6,698,866 B2 3/2004 Ward et al.
6,727,996 B1 4/2004 Silverbrook et al.
6,778,738 B1 8/2004 Billson
8,668,307 B2 3/2014 Lewartowski et al.
9,573,385 B2 2/2017 Moench et al.
9,764,573 B2 9/2017 Pitz et al.
10,252,552 B2 4/2019 Pitz et al.
10,513,110 B2 12/2019 Billow et al.
11,173,724 B1 11/2021 Zhang et al.
2005/0088510 A1 4/2005 Assa et al.
2007/0076021 A1 4/2007 Stancik et al.
2012/0133694 A1* 5/2012 Oshige ................ B41J 2/16526 347/14

(Continued)

OTHER PUBLICATIONS

Allam Shehata Hassanein et al, A Survey on Hough Transform, Theory, Techniques and Applications, IJCSI International Journal of Computer Science Issues, vol. 12, Issue 1, No. 2, Jan. 2015.

(Continued)

*Primary Examiner* — Jannelle M Lebron
(74) *Attorney, Agent, or Firm* — Ethos Legal PC; Jonathan D. Hall

(57) ABSTRACT

A novel printing system and associated printing methods that can overcome many of the obstacles presented by today's printing systems. In certain embodiments a printing vehicle is presented that may work in cooperation with other vehicles to produce a system capable of delivering a wide range of productivity and scale. This printing system is amenable to novel printing methods that can reduce printing defects and ink consumption by up to 30%.

10 Claims, 30 Drawing Sheets

(56) References Cited

U.S. PATENT DOCUMENTS

2015/0029262 A1 1/2015 Weingartner

OTHER PUBLICATIONS

Asharindavida, Fayas; Hundeqale, Nisar; Aljahdali, Sultan; Study on Hexagonal Grid in Image Processing.
He, Xiangjian; Jia, Wenjing, Hexagonal Structure for Intelligent Vision, 2005 IEEE.
Jeevan K. M., Padmaja V. K., Anne Gowda A. B., S. Krishnakumar, "Performance Analysis of Image Processing in Hexagonal Grid Based on Image Compression, Denoising and Steganography", International Journal of Engineering and Advanced Technology (IJEAT) ISSN: 2249-8958, vol. 9 Issue-1S6, Dec. 2019.
P. Stucki, MECCA—A multiple-error correcting computation algorithm for bilevel image hardcopy reproduction, 1981.
Sousa, Nuno Albuquerque; "Hexagonal Grid Image Processing". Jun. 6, 2014.

* cited by examiner 63.435 deg

SYSTEMS AND METHODS FOR IMPROVED PRINTING

CROSS-REFERENCE TO RELATED APPLICATION

The present application claims priority to U.S. Provisional Pat. App. No. 63/412,095, filed Sep. 30, 2022, the entire contents of which are incorporated herein by reference in their entirety.

BACKGROUND

The industrial print industry has matured significantly over the last decade. This market is dominated by inkjet printing technology that has seen significant gains through improved print head designs, novel ink chemistries, and new system designs. A primary vector of differentiation from one printer generation to the next has been through larger and faster printers as print providers (users of the printing systems) demand better print economics to remain cost competitive in an increasingly competitive marketplace. Printing system providers have responded to these demands by creating ever larger systems with more print heads, more colors, and higher productivity.

These larger systems come with multiple drawbacks. While the productivity of a single machine is improved, acquisition costs rise as well, sometimes disproportionately to the increased productivity. Higher system costs result from several consequences of architectural decisions made by the printer designer. First, to arrive at higher overall throughput, an inkjet printer typically needs more inkjet printing nozzles and longer nozzle arrays. This is accomplished by adding more print heads to the printer. In addition to the added costs of the additional print heads, this change drives higher costs in other parts of the system. Printed dots from all print heads must be located within a certain tolerance to dots printed from the other print heads. As the number of print heads increase and the nozzle arrays becomes longer, the tight tolerances within the printer carriage that conveys the print heads become increasingly more difficult to attain and the costs for precision components and precision adjustments within the printer carriage increases non-linearly with the size of the print head array. Adding additional print heads increases the demands on subsystems used to deliver ink to the heads, requiring larger and more pumps, filters, larger deaeration components, etc. Demand on curing and drying systems increases as well, and these costs contribute significantly to the overall cost of the printing system. These very large print systems often require automation to deliver unprinted print media to the printer and remove the printed product since a human operator will be unable to keep up with the throughput rate. These media automation systems can often rival the costs of the printer itself.

As is well known in the art of inkjet printing, to improve print quality, system designers will command a print carriage to pass over a portion of the print medium multiple times, often using different nozzles to print neighboring dots. This approach, called multi-pass printing, is highly effective at reducing the visual impact of printing errors like clogged or severely misdirected nozzles, errors in advancement of the print medium, or misregistration of the print heads. To gain more productivity without adding additional print heads, print system providers will work to optimize their system to reduce to a bare minimum the number of passes used to make a print. However, this can drive even tighter tolerances on the mechanical components and render a print system meta-stable, sensitive to small changes in environmental conditions, inevitable collisions between the printer carriage and the print medium, etc. As a result, users of the print system typically find they require a higher number of passes to consistently deliver high print quality, netting reduced productivity of their print system and challenging the business case based on which the system was initially procured.

A further disadvantage of the current approach is the limited flexibility it affords its end users. Print width is a good example. Industrial inkjet printers typically come in standard widths, depending upon the market for which the system was designed. For example, commercial graphics and signage printers typically come in widths of 1.8 m, 2 m, 3.2 m, and 5 m. The costs per system typically increase with increasing width. A system user must decide upon purchase what width to choose: picking a width too narrow will inevitably mean turning down wider printing jobs and picking a width too wide will mean paying more for a system than required. These large systems are also highly optimized for a given class of inks, drying, and substrate types. As a result, a system user requires multiple high-cost systems to meet the needs of multiple markets.

The attendant high-capital costs have changed the print industry. Small print shops that built the industry can no longer afford these high-priced systems, so they are faced with diminishing business or consolidation with ever-larger competitors. The industrial print market needs a better way to deliver cost-effective printed goods without the high capital costs required of today's systems.

The current industrial printing market has additional challenges. As mentioned above, multi-pass printing is an effective way to hide systematic errors in printing systems. However, print system providers are under pressure to reduce the number of passes, and thus the effectiveness of multi-pass printing, to increase productivity. As a result, print defects such as banding and streaks that propagate across the final print in the direction of the carriage motion are a common challenge for many print systems. A novel approach is required to reduce the overall sensitivity to systematic errors that give rise to banding and streaks.

Lastly, while the industrial printing market has seen significant strides in recent years, very little has been done to reduce one of the largest costs in printing: the total cost of ink. Marketplace competitiveness has squeezed margins on inks in many print segments, but few innovations have addressed the overall amount of ink required to produce a final print. A new print method capable of reducing ink consumption would be a welcome change in the industry.

SUMMARY

As will be better understood in the following description of embodiments, the described system, in its preferred embodiment, employs a different printing grid or raster than is used by systems today. Reference is made to documents identified in the disclosure filed with the application. A typical industrial inkjet printing system uses a square or rectangular pixel raster to represent the image to be printed. The present disclosure can take advantage of alternatively shaped pixels. Of particular interest is a hexagonal raster. A hexagonal raster presents multiple advantages over an orthogonal raster. The potential benefits of using a hexagonal raster rather than a rectilinear raster have been studied since it was first proposed by Golay in 1969. As enumerated by him and others, advantages of hexagonal rasters in intelligent vision systems are numerous and include higher degree of circular symmetry, uniform connectivity (i.e., all neighbors are connected equally), greater angular resolution, and potentially reduced memory demands. He and others tout hexagonal grids as the most efficient tessellation scheme when considering memory requirements to avoid aliasing at a given spatial frequency, requiring 13% fewer sampling points than a rectangular raster. Asharindavida and others explain how the hexagonal grid illustrates desired properties in the field of image processing due to the equivalence of neighboring pixels. For all but boundary pixels, all hexagonal pixels have 6 neighbors, each sharing the same size border with the pixel of interest (consistent connectivity) and each having a center equidistant from the center of the pixel of interest. This is in contrast to the only other two regular tessellation schemes, squares pixels and triangular pixels, where the distance to neighboring pixels is variant. Jeevan et al. observed improved peak signal to noise ratio when using a hexagonal grid compared to a square grid during digital image compression. Sousa anticipates improved performance of the hexagonal system due to its closer similarity to neuron arrangement in the retina, and demonstrates improved image quality for hexagonal raster with severely down-sampled images compared to the square raster case.

The advantages of using a hexagonal raster have not been lost on print system designers and references have been made to a hexagonal raster. Certain patent documents, including U.S. Pat. Nos. 6,727,996, 6,623,894, 6,778,738, 9,573,385 and U.S. Pat. Pub. Nos. 2005/0088510 and 2007/0076021, make mention of the possibility of using hexagonally shaped pixels or masks as an alternative to traditional rectilinear pixels in a variety of printing systems and modalities, though they do not describe how to create and print these pixels. U.S. Pat. No. 6,509,979 makes mention of the use of a hexagonal packed structure for the formation of meta-pixels representing a group of pixels. Several disclosures espouse the ink efficiency presented by using a hexagonal raster. U.S. Pat. No. 6,099,108, for example, discloses the use of a plurality of nozzles for each drop generator in a thermal inkjet print head. U.S. Pat. No. 6,099,108 makes mention of arranging a set of nozzles into a hexagon geometry to produce a hexagonal array of pixels that can reduce ink usage by 30%. Likewise, U.S. Pat. No. 6,659,589 recognizes some of the benefits of using a hexagonal raster, in particular its ink efficiency, and accomplishes a pseudo-hexagonal pattern by shifting either every-other row or every-other column by one-half a pixel distance. As illustrated by Asharindavida et al., this approach to attaining a pseudo-hexagonal raster fails to maintain the desired equidistant neighbor property that benefits a true hexagonal raster. U.S. Pat. No. 6,698,866 discloses using a different printing raster based on the content, e.g., using square or rectangular pixels for text and hexagonal for other content in an effort to more efficiently print the page.

Another feature of the present disclosure is the ability to address the print raster from multiple angles. U.S. Pat. No. 8,668,307 discloses rotation of the print head to address portions of the image. The technique disclosed in U.S. Pat. No. 8,668,307 can be used to reduce print time if the image being printed has long sections or segments containing image content separated by white space with no content. U.S. Pat. No. 8,668,307 does not disclose addressing the same section of the print with multiple angles except in the transition areas where the print head changes from one angle to another. In other words, a single segment of the image does not benefit from printing in multiple angles.

U.S. Pat. Pub. No. 2015/0029262 also discloses rotation of the print unit for the benefit of printing on the substrate in multiple angles. The motivation here, again, is to speed up the printing process so that areas of the image where no printing occurs can effectively be skipped over; U.S. Pat. Pub. No. 2015/0029262 discloses similarly to U.S. Pat. No. 8,668,307 to rotate the print head array to print each segment with image content in a preferred orientation. This orientation can increase the print speed for certain images that have printed areas separated by non-printing areas. Again, the benefits of printing single sections of the image in multiple orientations is not considered.

U.S. Pat. Nos. 9,764,573 and 10,252,552 are concerned primarily with printing onto curved surfaces and the need to reduce image artifacts associated with locations where separate paths of the printing array adjoin each other. To accomplish this, these patent documents disclose printing the surface with multiple orientations with the primary goal of breaking up intersections between the separate printing paths. The inventors call attention to the overlap regions where two printing paths with different orientations meet and pass over each other. Brief mention is made of the possibility to print these overlap regions using drops ejected during more than one printing path, but the mechanism by which these multiple paths can cooperatively print a section of the image is not disclosed. As will be understood through discussion of the current disclosure, effective cooperation of the multiple passes along with desired high effective nozzle usage requires several aspects not disclosed hitherto. By way of illustration and example, addressing a square raster at any angle other than 0 degrees or 90 degrees means that only a very small portion of the nozzles will be over a pixel during a printing pass (unless an additional rotational axis is provided that decouples the print head angle and the directional of print head travel). The impact is a reduction in the usage rate of the printing nozzles, lower productivity, and ultimately higher print costs.

There are multiple ways to provide relative motion between the printing array and the printing substrate. In particular, several ways are well suited to accommodating different print orientations as required by the present disclosure. A typical industrial inkjet printer uses two main axes of motion: translation of the carriage across the print bed (x-axis) and indexed motion of the substrate (y-axis) orthogonally to the x-axis. By adding a third motion, theta-z, an axis of rotation about the normal to the plane created by the x-axis and y-axis, and using concurrent motion of the x-axis and y-axis of motion after properly orienting the print heads in theta-z, the print array can be caused to address the print substrate in a multitude of angles. This is the approach disclosed in U.S. Pat. Pub. No. 2015/0029262. While effective in providing multiple printing directions and orientations, this approach comes with all the costs of a typical industrial printer plus the added costs of an additional axis of motion.

A second way to achieve the necessary degrees of freedom is to use a robotic arm to translate the print head array across the substrate. A properly chosen robot will be capable of effecting the same x-axis, y-axis, and theta-z axis of motion described above. Indeed, multiple commercial examples of putting print arrays at the end of robot arms to achieve this type of motion for printing exist. This is the approach disclosed by U.S. Pat. Nos. 9,764,573 and 10,252,552.

A third way to accomplish this type of relative motion is through a self-propelled vehicle that contains the necessary components to accomplish the motion and printing during a printing pass. The details of such a vehicle will be discussed in following sections.

Another embodiment is to provide the printing vehicle with the necessary printing components and propel it through an outside motive force. Using magnetic levitation for these "movers" is a technology that has been commercialized elsewhere (e.g., Beckhoff)(Planar Planar Motor System) for other purposes (e.g., moving inventory or supplies in an automated fashion). This methodology for motion will be discussed as one embodiment of the disclosed subject matter.

The disclosed systems and methods of printing accomplish several objectives over the disadvantages of prior designs, including:

- A printing system that can scale from low productivity demands (and low acquisition costs) up to high productivity meeting the demands of larger print shops.
- A printing system that reduces sensitivity to dot placement errors that generate imaging artifacts to reduce required mechanical tolerances and associated costs.
- A printing system that gives the end user flexibility in terms of print size, print substrate type, ink types, and curing/drying technology.
- A printing system that maximizes the usage of the nozzles within the print array and, in doing so, reduces the number of nozzles required for a given productivity.
- A printing system that enables ink savings through more efficient ink deposition.

A novel industrial printing system and associated printing methods are proposed that can overcome many of the obstacles presented by today's state-of-the-art systems. A novel printing method is proposed that enables printing in multiple, non-parallel and non-orthogonal directions. This approach has been shown to reduce sensitivity to some of the most common printing errors. This printing method includes printing onto non-rectangular printing rasters; critically, the print raster and printing angles are chosen so that a large portion of the pixels over which the print system passes during a printing pass are addressable by the printing system. This aspect of the current disclosure enables high print engine usage during printing, realizing high productivity. As will be shown, this printing method additionally can reduce print material/ink consumption by up to 30%.

Within the present disclosure, non-parallel shall be defined as, between printing directions, a relative angle of at least one degree or more. For this purpose, two directions that differ by 180 degrees+/−1 degree are considered to be parallel. Likewise, non-orthogonal shall be defined as between printing directions with a relative angle other than 90 degrees+/−1 degree and 270 degrees+/−1 degree.

A printing vehicle (APV) is presented that can print in a manner consistent with the novel printing methods described herein. In some embodiments, the APV can be semi-autonomous. Furthermore, the APV may work in cooperation with other APVs to produce a system capable of delivering a wide range of productivity and scale.

The APV is a self-contained printer that traverses the print medium. The APV contains all the printing hardware necessary for printing on the print medium, including print heads, ink delivery systems, and any other necessary support systems such as curing. The APV can be made to traverse the print medium under its own power through a self-contained propulsion and position encoding system. An on-board power supply can provide the energy required for printing. Alternatively, the printing vehicle can be powered and moved via external forces, e.g., through an electromagnetic force, but in all preferred embodiments the components required for printing are contained within the vehicle.

Printing in accordance with the present disclosure allows for significant scaling and flexibility. In its simplest form, a single APV can contain all the colors required to complete a print and work in isolation. Alternatively, an APV may contain a single color and work with other APVs containing other colors to produce a multi-color print. Still further, a single color may be cooperatively printed by multiple APVs that work with other coordinated APVs to produce the final print at high productivity.

Because the APV is not constrained to follow a fixed path as is the case for printer carriages in many of today's printing systems, a single APV or a swarm of APVs can print substrates of nearly any size. This approach to printing lends itself to printing fixed substrates such as floors, patios, driveways, etc. Furthermore, the present disclosure herein illustrates how this flexibility in motion can be leveraged to address the print raster in multiple non-orthogonal directions. This printing approach significantly reduces the system's sensitivity to systematic dot placement errors and results in prints with improved print quality and reduced banding and streaks. Furthermore, the approaches disclosed herein serve to maximize the nozzle usage rate within the print array in the case of inkjet printing, reducing the overall number of nozzles required for a given productivity and reducing system costs.

While the present disclosure is well suited for printing on discrete print media (e.g., boards, sheets, tiles, doors, etc.), it is also possible to print in accordance with the present disclosure on web-based substrates such as performed in roll-to-roll printers of today. The single APV or the swarm of APVs simply complete one section of the roll-based print in between media advances by a separate media conveyance system. A section printed as such might be fully completed or only partially completed, allowing blending of two sections. Conveyance of the media and the motion and printing activity of the APV's could also be coordinated to occur simultaneously.

The printing system may include an ancillary component separate from the APV where the APV can receive periodic maintenance. This component, which may be colloquially referred to as the "garage", performs servicing of the nozzle array to maintain reliable drop ejection, recharges onboard batteries, and other routine maintenance acts.

The present disclosure as illustrated and described herein will be understood to be applicable to a wide variety of printing methods. Inkjet is a dominant printing modality, and so the utilization of the present disclosure in conjunction with inkjet printing is thoroughly described. Other methods of printing are capable of employing the disclosed printing method as well. Writing with a laser onto photoconductive blankets as may be employed in electrophotographic printing is one example. Thermal printing that sublimates colorant for deposition onto a substrate is another example of a printing method that can use aspects of the present disclosure. The phrase "print method" or "printing method" used herein is meant to be inclusive of a wide range of printing modalities as exemplified above. Likewise, the terms "print system" or "printing system" is intended to include systems capable of printing using these different print modalities and also capable of practicing one or more aspects of the present disclosure. "Print materials" are those materials being ejected, cured, deposited, sublimated, or otherwise transferred during the printing process. For an inkjet signage printer, or example, the print material is ink. “Print unit” is meant to describe a component of the printing system that is responsible for selectively printing of the print materials during the printing operation. A “print substrate” or “printing substrate” is intended to describe the surface or object onto or into which the print system is depositing, transferring, curing, or otherwise affecting a print material. For a label printer, for example, the print substrate is the blank label stock onto which the colorants are deposited. Print media is a synonym for print substrate.

A first embodiment method of printing for improved image fidelity, includes: providing at least one printing unit configured to print at least one print material according to a set of print data; providing a printing raster containing raster locations, each raster location associated with a portion of the print data; conducting a first printing pass by moving the printing unit relative to a printing substrate in a first printing direction while printing at least one print material according to at least a portion of the print data, conducting a second printing pass by moving the printing unit relative to the printing substrate in a second printing direction while printing the at least one print material according to at least a portion of the print data, wherein the first printing direction and the second printing direction are disposed at a non-orthogonal differential angle, and wherein the printing raster, the first printing direction and the second printing direction are together selected such that at least 25% of the raster locations defined in the printing raster are capable of being printed by the printing unit during each of the first printing pass and the second printing pass.

The first embodiment may include wherein a spacing between the raster locations in a direction perpendicular to the relative motion created during the first printing pass is substantially equal to a spacing between the raster locations in a direction perpendicular to the relative motion created during the second printing pass.

The first embodiment may include wherein the printing raster is represented by a regular tessellation scheme.

The first embodiment may include wherein the printing raster includes a plurality of pixels, wherein a center of each pixel in the printing raster is equidistance to a center of each neighboring pixel.

The first embodiment may include wherein the printing raster is represented by a hexagonal grid.

The first embodiment may include wherein the differential angle between the two printing directions is an integer multiple of 60 degrees.

The first embodiment may include wherein the at least one print material is a plurality of print materials and wherein at least a portion of the different print materials are printed by separate print units.

The first embodiment may include wherein the at least one print unit is a plurality of print units that print the same print material.

The first embodiment may include wherein the relative motion of the first printing pass and the second printing pass is effected by a robotic arm that transports the at least one printing unit across the printing substrate that is stationary.

The first embodiment may further include: at least one of: loading with the robotic arm a new print media, and unloading with the robotic arm a printed media.

The first embodiment may include wherein the relative motion of the first printing pass and the second printing pass are effected by an electromagnetic force created between the printing unit and a device external to the print unit.

The first embodiment may include wherein the relative motion of each of the first printing pass and the second printing pass are effected by a locomotion mechanism contained within the print unit.

The first embodiment may include wherein the relative motion of the first printing pass and the second printing pass are effected by a plurality of axes of motion external to the at least one print unit that work in concert to produce the first print direction and second print direction.

The first embodiment may include wherein:

- the axes of motion include at least two linear paths of motion that are nonparallel with respect to each other,
- the axes of motion including a third axis of motion that produces a rotation of the print unit about an axis that is perpendicular to the plane created by the first two axes of motion, and
- operating the two linear axes in concert to produce a desired print direction.

The first embodiment may include wherein:

- an ink deposition device of the print unit possesses a long axis aligned and in the direction of a linear set of nozzles within the at least one print unit, and
- whereas the rotation of the print unit is such that the print direction is orthogonal to the long axis of the ink deposition device.

The first embodiment may include wherein the first printing pass and the second printing pass overlap each other and at least a portion of the print data is printed during the first printing pass and at least a portion of the print data is printed during the second printing pass.

The first embodiment may include wherein the portion of the print data printed during the first printing pass and the portion of the printing data printed during the second printing pass are at least partially complementary.

The first embodiment may include wherein said printing is performed in a multi-pass printing mode wherein at least a portion of the substrate receives ink in at least two different printing passes using substantially the same printing direction.

The first embodiment may include further comprising the steps of:

- conducting a third printing pass by moving the printing unit relative to the printing substrate in a third printing direction while printing the at least one print material according to at least a portion of the print data, and
- wherein the third printing direction is nonparallel to the first printing direction and the second printing direction.

The first embodiment may include wherein first printing direction, the second printing direction and the third printing direction are angled relative to one another by an integer that is a multiple of 60 degrees.

The first embodiment may include wherein at least one of the first printing pass and the second printing pass is determined prior to the commencement of printing.

The first embodiment may include wherein the print unit is transported to the print substrate and the print substrate remains static following the first printing pass and the second printing pass.

A second embodiment includes: moving a printing unit relative to a printing substrate along a first printing axis while depositing at least one printing material according to a raster, moving the printing unit relative to the printing substrate along a second printing axis while depositing the least one printing material according to the raster, moving the printing unit relative to the printing substrate along a third printing direction while depositing the least one printing material according to the raster, wherein the first printing direction, the second printing direction and the third printing direction are each offset from one another by a 120 degree angle, and wherein the raster represents an image as a two-dimensional series of hexagonal pixels.

A third embodiment includes: a print carriage having a print head configured to jet at least one print material from a series of nozzles and rotatable about an direction orthogonal to a plane of a print surface, wherein the print carriage is traversable relative to the print surface in a first printing direction, wherein the print carriage is traversable in a second printing direction non-orthogonal to the first printing direction, and a print controller configured to direct the jetting of the at least one print material according to a non-rectilinear raster.

A fourth embodiment includes: a vehicle body having a print head configured to jet at least one print material from a series of nozzles, wherein the vehicle body is configured to traverse relative to a print surface in at least a first printing direction and a second printing direction, and a print controller configured to direct the jetting of the at least one print material according to a non-rectilinear raster.

A fifth embodiment includes: moving a printing unit relative to a printing substrate along a first printing direction while depositing at least one printing material according to a raster, moving the printing unit relative to the printing substrate along a second printing direction while depositing the least one printing material according to the raster, moving the printing unit relative to the printing substrate along a third printing direction while depositing the least one printing material according to the raster, wherein the second printing direction and the third printing direction are each offset from the first printing direction by a 120 degree angle, and wherein the raster represents an image as a two-dimensional series of hexagonal pixels.

A sixth embodiment includes: providing a printing unit containing nozzles configured to eject a print material, providing a printing raster containing raster locations as digitized data representing content to be printed associated with each raster location, providing a printing substrate for receiving ejected print material, conducting a printing process including:

- conducting a first printing pass by traversing the nozzles relative to the printing substrate in a first printing direction, wherein a center of each nozzle creates a nozzle path,
- conducting a second printing pass by traversing the nozzle relative to the printing substrate in a second printing direction, wherein a center of each nozzle creates a nozzle path,
- wherein the first printing direction is non-orthogonal relative to the second printing direction, and wherein the printing raster and the first printing pass direction and the second printing direction are together selected such that the nozzle path taken by at least 50% of the nozzles intersects at least one pixel location in the printing raster.

The sixth embodiment may include wherein the printing process is performed in a multi-pass printing mode wherein at least a portion of the substrate receives the print material during at least two printing passes using substantially the same printing pass direction.

The sixth embodiment may further include:

- wherein the printing raster has a pixel spacing that is closer than a spacing between two consecutive nozzles within the printing unit,
- wherein the at least two printing passes have substantially parallel printing directions that are offset with respect to each other in at least one direction, and
- wherein the offset permits the at least two passes to print substantially different locations in the printing raster.

A seventh embodiment may include: a printing device, including: an print material supply, at least one printing unit for depositing said print material, a power supply, a control unit, and a locomotion means configured to move the printing device in its ambient environment without a physical connection between the printing device and another device, mechanism or component, and wherein the control unit is configured to print according to a hexagonal raster in at least a first printing direction and a second printing direction that are at a non-orthogonal differential angle relative to one another.

The seventh embodiment may further include a curing process unit.

The seventh embodiment may further include a location determining means for determining the position of the printing device relative to the printing substrate.

The seventh embodiment may include wherein the location determining means includes at least one optical sensor.

The seventh embodiment may include wherein the location determining means includes at least one camera external to the printing device that images at least a portion of the printing device, determines the printing device location, and periodically provides location information to the printing device.

The seventh embodiment may include wherein the location determining means includes a laser tracker where a laser separate from the printing device optically senses the location of a reflector or prism on the printing device.

The seventh embodiment may include wherein the location determining means includes a substantially stationary plane that is encoded magnetically in two dimensions and whereby a magnetic head reader on the printing device senses the magnetic encoding.

The seventh embodiment may include wherein the plane with magnetic encoding is suspended above and in proximity to the printing device.

The seventh embodiment may include:

- the one or more optical sensors are used to detect printing marks created by the printing device and derive location information from the detected printing marks.

The seventh embodiment may include wherein the locomotion means is configured to generate an electromagnetic force between the printing device and a second apparatus separate from the printing device and in relative motion to printing device.

The seventh embodiment may include wherein the second apparatus is a stator that is stationary.

The seventh embodiment may include wherein the stator includes a set of conducting coils capable of conducting electricity and wherein the printing device contains permanent magnets, the conducting coils and magnets creating the electromagnetic force between the printing device and the stator.

The seventh embodiment may include wherein the printing device is a plurality of printing devices configured to print at least partially simultaneously onto the print substrate.

The seventh embodiment may include further comprising a central computer system configured to coordinate printing actions by the plurality of printing units.

The seventh embodiment may include wherein the at least one print unit only partially dries or cures the print material on the substrate.

The seventh embodiment may include:

a curing unit including:

- a power supply,
- a control unit, and
- a means for locomotion that operates devoid of a physical connection to another device, mechanism or component.

The seventh embodiment may include wherein the curing unit is a plurality of curing units configured to work cooperatively with one or more print devices, as described immediately above, to effectively dry or cure the print.

The seventh embodiment may further include:

a maintenance device for maintaining the printing device including:

- a mechanical guide that interfaces with the printing device configured to positively locate the printing device with respect to the maintenance device, and
- a cleaner subsystem that is configured to service the print unit.

The seventh embodiment may further include a charging subsystem that electrically interfaces to the printing device and can at least partially recharge a power supply on the print device.

The seventh embodiment may further include a print material refilling subsystem that supplies the printing device with additional print material.

The seventh embodiment may further include an optical system for guiding the printing device to the maintenance device prior to the printing device engaging the mechanical guide.

An eight embodiment includes: providing a halftone of an input image represented on a hexagonal raster, discretizing an input pixel based upon a number of discrete levels desired in an output image, distributing the error of the discretization to pixels in the vicinity of the input pixel based upon an error diffusion filter wherein the error diffusion filter distributes greater than or equal to 25% of the error to pixels directly adjacent to the input pixel, wherein the error distributed to each given input pixel is added to that input pixel's current value, and repeating the steps of discretizing and distributing error until all pixels of the input image have been discretized.

The eighth embodiment may include wherein said error diffusion filter distribution is:

$P_1$=5/16, $P_4$=5/16, $P_5$=5/16 and $P_6$=1/16.

The eighth embodiment may include wherein the error diffusion filter is:

$P_1$=3/16, $P_2$=2/16, $P_3$=2/16, $P_4$=3/16, $P_5$=3/16, $P_6$=2/16 and $P_7$=1/16.

The eighth embodiment may include wherein said error diffusion filter is: 25

$P_1$=3/16, $P_2$=1/16, $P_3$=1/16, $P_4$=3/16, $P_5$=3/16, $P_6$=2/16, $P_7$=1/16, $P_8$=1/16 and $P_9$=1/16.

The eighth embodiment may include wherein the error diffusion filter has coefficients that contain only numerators and divisors that are powers of two.

The eighth embodiment may include wherein said error diffusion filter is:

$P_1$=4/16, $P_2$=1/16, $P_3$=1/16, $P_4$=4/16, $P_5$=4/16, $P_6$=1/16 and $P_7$=1/16.

The eighth embodiment may include wherein said error diffusion filter is:

$P_1$=8/32, $P_2$=1/32, $P_3$=1/32, $P_4$=8/32, $P_5$=8/32, $P_6$=2/32, $P_7$=1/32, $P_8$=2/32 and $P_9$=1/32.

A ninth embodiment is a method of image processing to discretize an input image represented on a input image hexagonal raster based upon a number of discrete levels desired in an output image wherein the includes: comparing a pixel value in each pixel location of the input image hexagonal raster to a pixel value in a thresholding hexagonal raster wherein the pixel value for each pixel in the second hexagonal raster is a threshold value, and selecting, for each pixel location in an output image hexagonal raster, a discretized value based on the step of comparing.

The ninth embodiment may include wherein the pixel values in the thresholding hexagonal raster have a higher average frequency of variation compared to an average frequency of variation of the input image hexagonal raster.

The ninth embodiment may include conducting a multilevel printing process that places less-than-the-maximum print material in pixel locations adjacent to a line when that line lies parallel to, or within 20 degrees of parallel to, an axis in which hexagonal pixels adjacent to each other in the direction of the axis are staggered one-half a pixel perpendicularly to the axis.

The ninth embodiment may include rotation of the hexagonal grid so that the axis of the grid in which adjacent pixels lie in a straight line in the direction along that axis are parallel to the dominant direction of straight lines in the input image.

The ninth embodiment may further include:

- determining a straight line dominant direction of the input image, and
- rotating the output image hexagonal raster such that an axis in which adjacent pixels that lie in a straight line in the direction along that axis are parallel to the straight line dominant direction.

A tenth embodiment is a method of printing with improved image fidelity, including: providing at least one printing unit configured to print at least one print material according to a set of print data, providing a printing raster containing raster locations, each raster location associated with a portion of the print data, conducting a first printing pass by moving the printing unit relative to a printing substrate in a first printing direction while printing at least one print material according to at least a portion of the print data, conducting a second printing pass by moving the printing unit relative to the printing substrate in a second printing direction while printing the at least one print material according to at least a portion of the print data, wherein the first printing direction and the second printing direction are disposed at a non-orthogonal and nonparallel angle, wherein the printing raster, the first direction and the second printing direction are together selected such that at least 25% of the raster locations defined in the printing raster are capable of being printed by the printing unit during each of the first printing pass and the second printing pass, and wherein the first printing pass and the second printing pass are conducted with the nozzle array arranged to be substantially parallel to an axis of the print raster.

Although the present disclosure is illustrated and described herein, those skilled in the art will understand the multiple applications and uses of the described print system and methods, and it should be understood that the present disclosure is not limited to the details shown. Various modifications and alterations are anticipated that remain within the spirit of the present disclosure and within the scope and range of equivalents of the claims.

BRIEF DESCRIPTION OF THE DRAWINGS

The design of the print system and its methods of operation will be best understood from the following description of several embodiments when read in connection with the accompanying drawings. The drawings are not necessarily to scale and instead are provided to emphasize important facts of the prior art or the present disclosure.

DETAILED DESCRIPTION

Figure 1A:
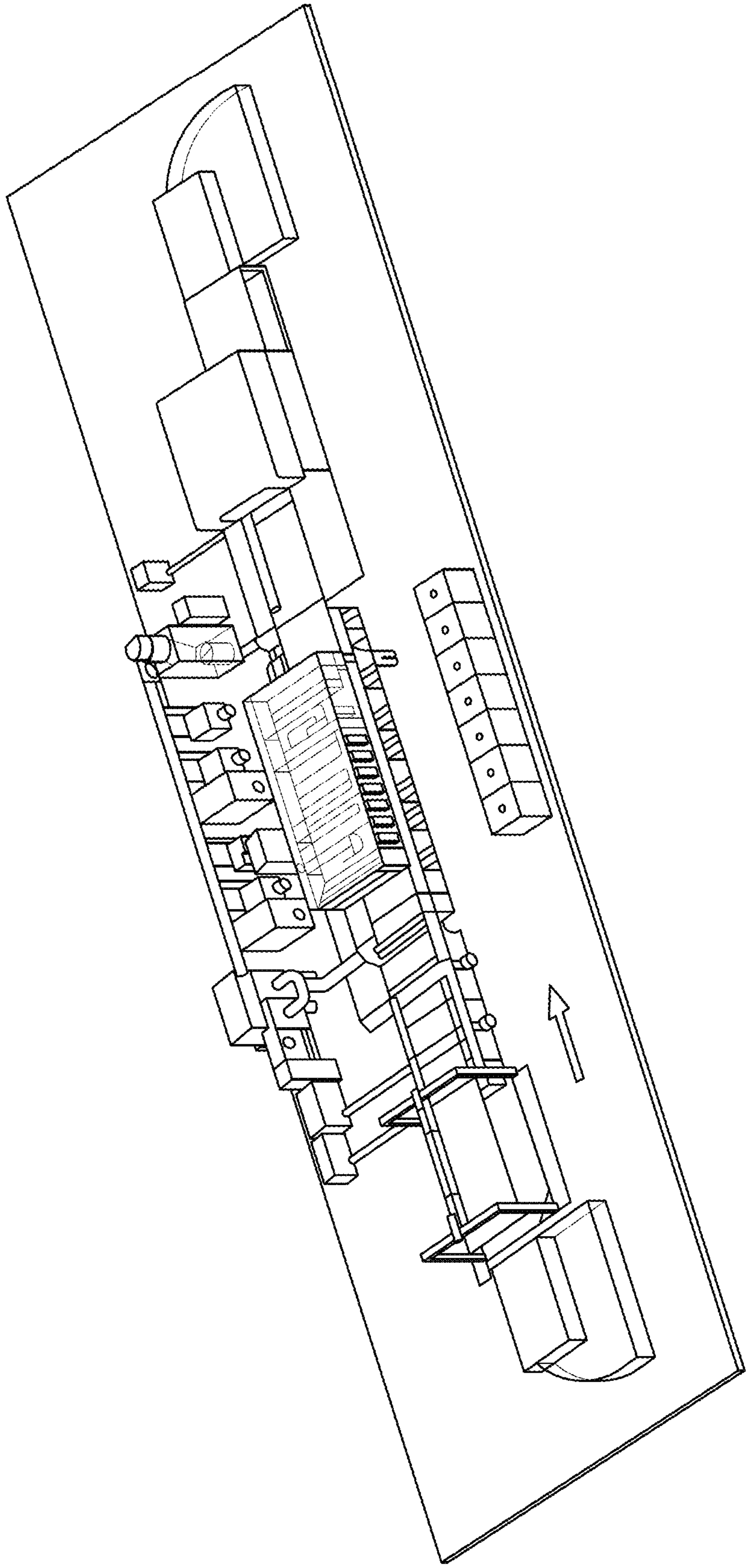
FIG. 1A PRIOR ART
FIGS. 1A-B depict a typical existing large industrial printer containing a multitude of print heads.

FIG. 1A is an isometric view of a packaging printer in the prior art specialized for the purposes of printing onto corrugated boards. The depicted printer is well in excess of thirty-five meters in length and can exemplify the size and resulting high price required in today's industrial printing market.

Figure 1B:
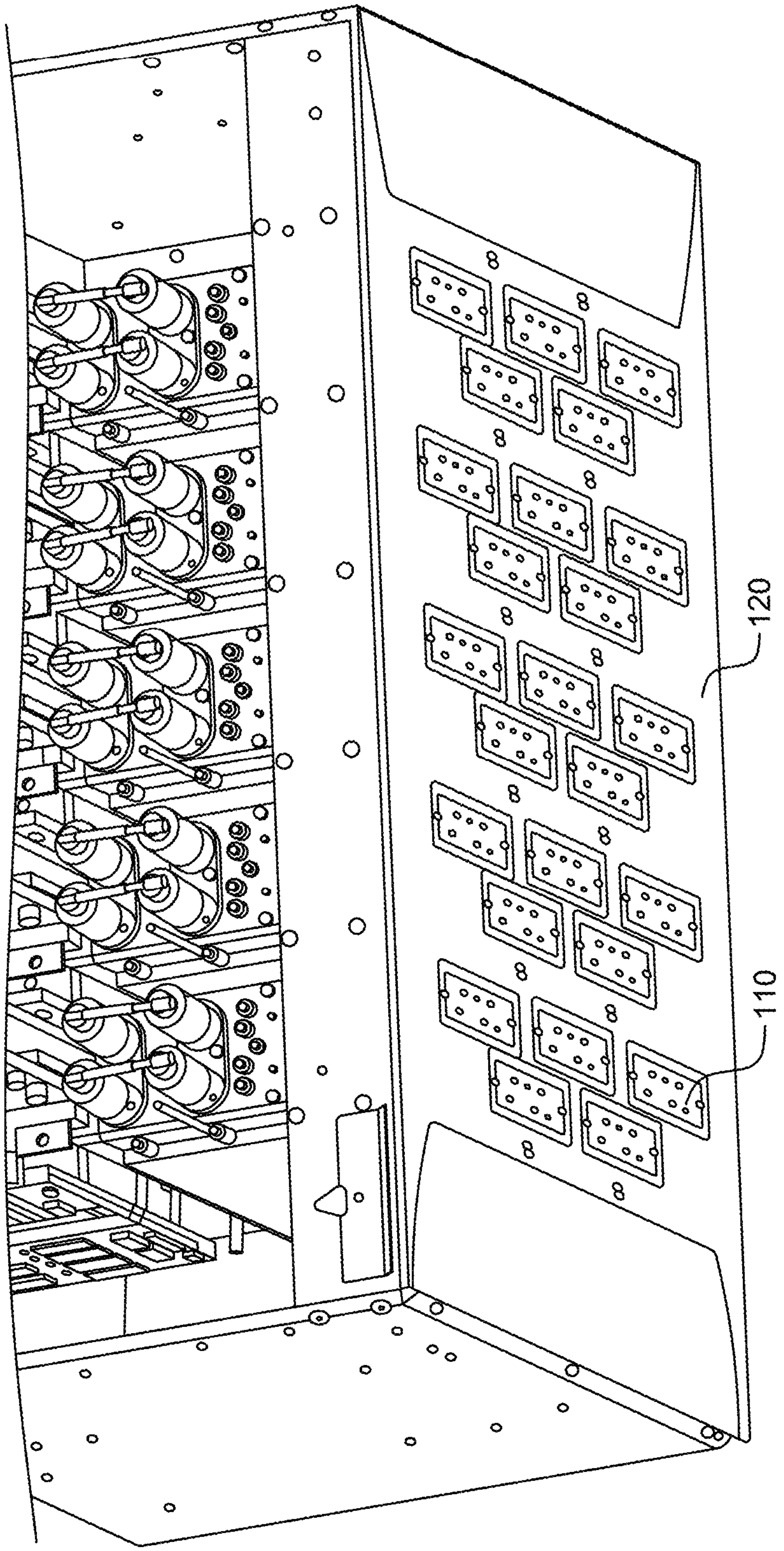
FIG. 1B PRIOR ART

FIG. 1B from U.S. Pat. No. 11,173,724 is also from the prior art and shows the portion of a different printer, the illustrated component called the carriage which contains the print heads 110. The carriage and the print heads move bidirectionally in a single linear axis in the prior art. The jet plate 120 is a substantially a single piece that is created with tight tolerances to get good alignment between all the print heads. The number of print heads seen in FIG. 1B is driven by the desire for increase productivity, more print heads yielding more nozzles that can print more dots on each pass of the carriage. The example in FIG. 1B shows a carriage with five colors, each color being printed by five print heads.

As is illustrated in FIG. 1B, a single printer can have many print heads 110, all requiring good alignment to the other print heads 110. As the number of print heads increases, the number of tolerances required to ensure good alignment naturally increases as well. Furthermore, as tolerance demands and size increase, so does the required stiffness of the holding members such as the jet plate 120, typically adding more mass to the carriage in the way of thicker components and additional stiffening members. All told, carriages in present high-end industrial printers can be well in excess of 400 kg. This high mass drives costs in the rest of the system in the shape of bigger frames, bigger motors, and larger footprints.

Figure 2:
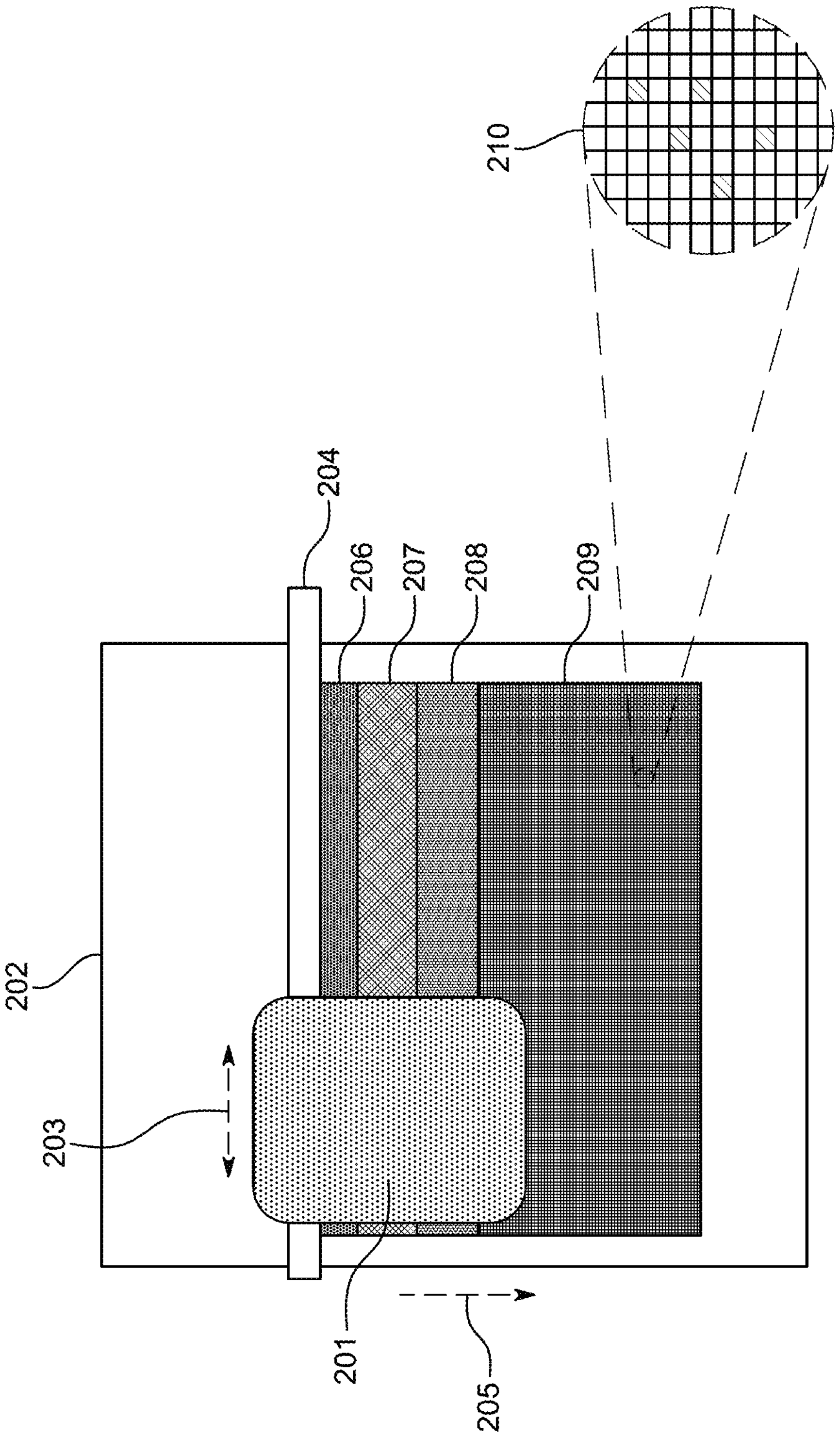
FIG. 2 PRIOR ART
FIG. 2 is a plan schematic view of the primary components of an existing industrial inkjet printer and its two primary axes of motion. The inset illustrates the rectangular raster typical of the prior art.

FIG. 2 shows a conceptual drawing of how an industrial printer in the prior art operates. First, the printer is furnished with a printer carriage, 201. The carriage contains the print heads that are responsible for ejection of one or more inks to create the final printed product on the print medium, 202. FIG. 2 exemplifies a "shuttle printer" so named because the carriage is shuttled across the print medium in a given direction, the carriage motion direction 203, traveling along a carriage rail 204. The carriage motion direction is typically orthogonal to the second main axis of motion, the media feed direction 205. Most typical of the prior art, the media feed direction is primarily unidirectional; that is, the print medium 202 is fed under the printer carriage 201 and then held stationary while the printer carriage 201 traverses across the print medium 202 in the carriage motion direction 203, thus creating a printing pass. A particular advantage of a shuttle printer is its ability to address a part of the print medium multiple times, using multiple printing passes to print a given area of the printing medium. This is illustrated in FIG. 2 where, by way of example, the printing is accomplished in a four-pass printing mode. In a first pass across the stationary print medium in carriage motion direction 203 the carriage can partially print an area 206. In a four-pass printing mode this first area 206 might have roughly one-quarter of the printing completed, though those skilled in the art will recognize a multitude of algorithms to distribute the printing across the different printing passes. After printing area 206, the print medium is indexed in media feed direction 205 and again held stationary. The previously printed area is printed again by the carriage to create an area 207 that might have roughly half of the printing completed. Again, the print medium is indexed and a third pass of the printer carriage is executed and printing completed to create an area 208 having roughly three-fourths of the printing completed. Finally, a fourth pass is executed to complete the printing in this section of the print media, creating a completed print area 209. This manner of multi-pass printing is well known in the art and is used effectively to reduce printing defects. Likewise, multi-pass printing can additionally be used to create a print having a higher resolution than the native resolution of the print head. By indexing the print media a distance dy*(N+m) where dy is the native spacing between nozzles in the media feed direction 205, N is a natural number and m is a fractional number such as ½ or ¼, a printer can print at a higher resolution than the native print head. For example, if m is chosen to be equal to ½ and the print head has a native resolution of 600 dpi, this method of multi-pass printing can be used to create a 1200 dpi print.

FIG. 2 also shows a close-up 210 of how the image is represented in digital form. With two orthogonal axes of motion 203 and 205, the use of square or rectangular pixels is an efficient way to represent and print the digital image and this type of digital image representation is used almost exclusively in the prior art. The pixels shown in 210 illustrate how the digital image can represent a binary image, i.e., pixels are intended to be printed or not. Likewise, multilevel printing is well-known in the prior art wherein pixels can contain intermediate levels. For example, some print heads can eject drops of multiple sizes, e.g., small, medium, and large drops. A digital image printed on such a printer may take advantage of this capability and represent the image data not simply as on-or-off but rather as 4-levels to utilize all the drop sizes and the condition with no drop. Even print heads that eject a single drop size can be used to create a multilevel print by placing multiple drops at a single pixel location.

Figure 3:
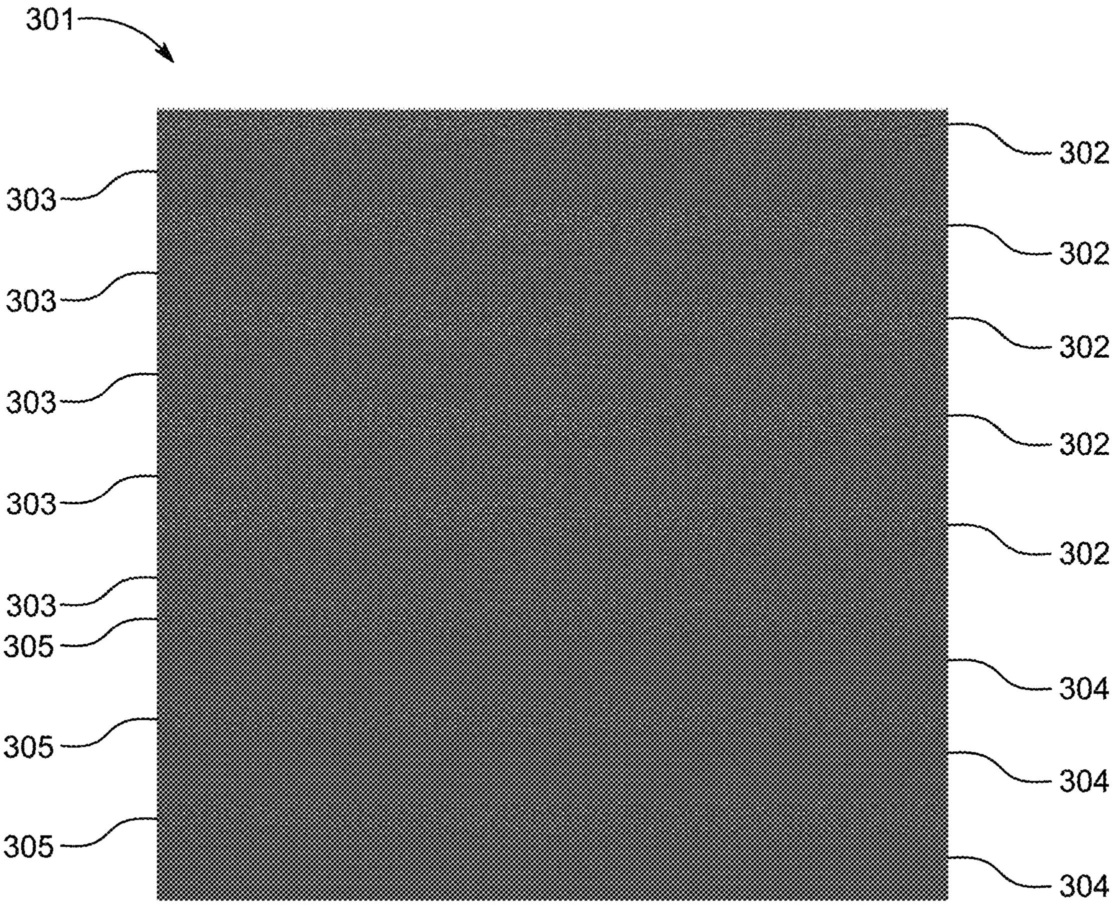
FIG. 3 PRIOR ART
FIG. 3 is a simulation of a print created by a print system using the prior art when the print system contains two types of dot placement errors.

While the square raster shown in 210 of FIG. 2 is an effective way to represent digital image data, printing such a raster in a method illustrated in FIG. 2 can lead to print quality defects in the final print despite the use of multi-pass printing. FIG. 3 is an illustration of such a print quality defect. FIG. 3 is the result of a printing simulation wherein the entire printing process is simulated in software and the dots printed by the simulated printing process are simulated in a high-resolution image to create a facsimile of what an actual print would look like. In the case of FIG. 3, the print 301 is simulated using a 20× simulation, that is, a single printed pixel is represented by 20×20 or 400 pixels in the digital image to create the simulation image of FIG. 3. Simulations such as these are good predictors of expected print quality of a hypothesized printer. In particular, dots of varying shapes can be simulated and the placement of those dots can be varied in accordance with different errors that could exist in the hypothesized printer.

The simulated print of FIG. 3 represents the output expected from a printer utilizing a 6-pass multi-pass printing mode wherein roughly one-sixth of the dots are printed on one of the six passes over the print medium. The simulated print represents a print having these characteristics:

- 600×600 dpi print mode
- A dot size of approximately 57 microns in diameter
- The print size is approximately two-thirds of an inch in both directions
- The printer uses a print head having 300 nozzles all spaced at $1/600^{th}$ an inch part making the print head one-half inch in length
- A single black ink channel is simulated using a binary print mode
- The input image is one that requests a single printed dot at every pixel location.

To complete the simulated print, the printer must make approximately 12 total passes with the simulated printer indexing the print medium approximately one-twelfth of an inch between each pass. In this simulation, two primary error sources are being investigated. First, while the spacing between all the nozzles is nominally 42.3 microns (one sixth-hundredth of an inch), the spacing between nozzles 269 and 270 is 15 microns larger, or 57.3 microns. This type of error is common when stitching multiple print heads together: the spacing between nozzles within a single print head is very well controlled but the spacing between two print heads can be subject to a variety of errors. By increasing the spacing between two nozzles we are able to simulate the effect of such an error. This is called stitch error.

The second primary source of error simulated in FIG. 3 is a media indexing error on the sixth pass. Nominally, the media is indexed in the media feed direction (e.g., element 205 of FIG. 2) a linear distance of 50 pixels or approximately 2.117 mm. On pass number six, a 10-micron error has been introduced causing the media to instead advance 2.127 mm. This is called step error.

The simulated print 301 of FIG. 3 illustrates a defect well-known to those skilled in the art called banding. Banding can take many forms, but it typically is a horizontal section or band within the print with an unintentional different lightness or color compared to the intended lightness or color and, importantly, a different lightness or color compared to the neighboring regions. This variation creates an objectionable artifact to the user. Areas 302 of simulated print 301, for example, are lighter than areas 303 giving rise to the observation of banding. As illustrated, banding can often be repeating down the print, making the defect even more objectionable.

Areas 304 are those regions of the print with the desired lightness. Areas 305, by contrast, show the minor banding defect caused by the stitch error alone. Areas 303 are those sections of the print affected by only the step error. Areas 302 are those sections of the print impacted by both the stitch error and the step error. In the areas 302 the stitch error and step error combine constructively to create a larger error together, shifting some portion of the dots in that region by both the stitch error and the step error. Other dots in those same areas 302 are affected by only one or the other or neither of the errors, making a relatively large dot placement error between the different dots printed in areas 302. This relative dot placement error causes dots to substantially and unintentionally overlap while simultaneously leaving some areas of the print without any ink. This is what gives rise to the apparent relative lightness of the areas indicated by 302.

This type of interference between print errors is common in the prior art. The resulting print defects are the motivation in the prior art to decrease allowable error tolerances in printer components, making printers more difficult and more expensive to build. The sensitivity of this prior art printing process results from the highly constrained relative motion between the print heads and the print medium.

The subject matter of the present disclosure eliminates these constraints through several novel concepts. The first of these concepts provides a "carriage" for the print heads that permits a myriad of print directions so that the relative motion between the print medium and the carriage is not constrained to be a single direction or multiple directions that are substantially parallel to each other. By traversing the print head across the print medium in multiple non-parallel directions, the "constructive interference" of printing errors present in different passes is significantly reduced.

Figure 4A:
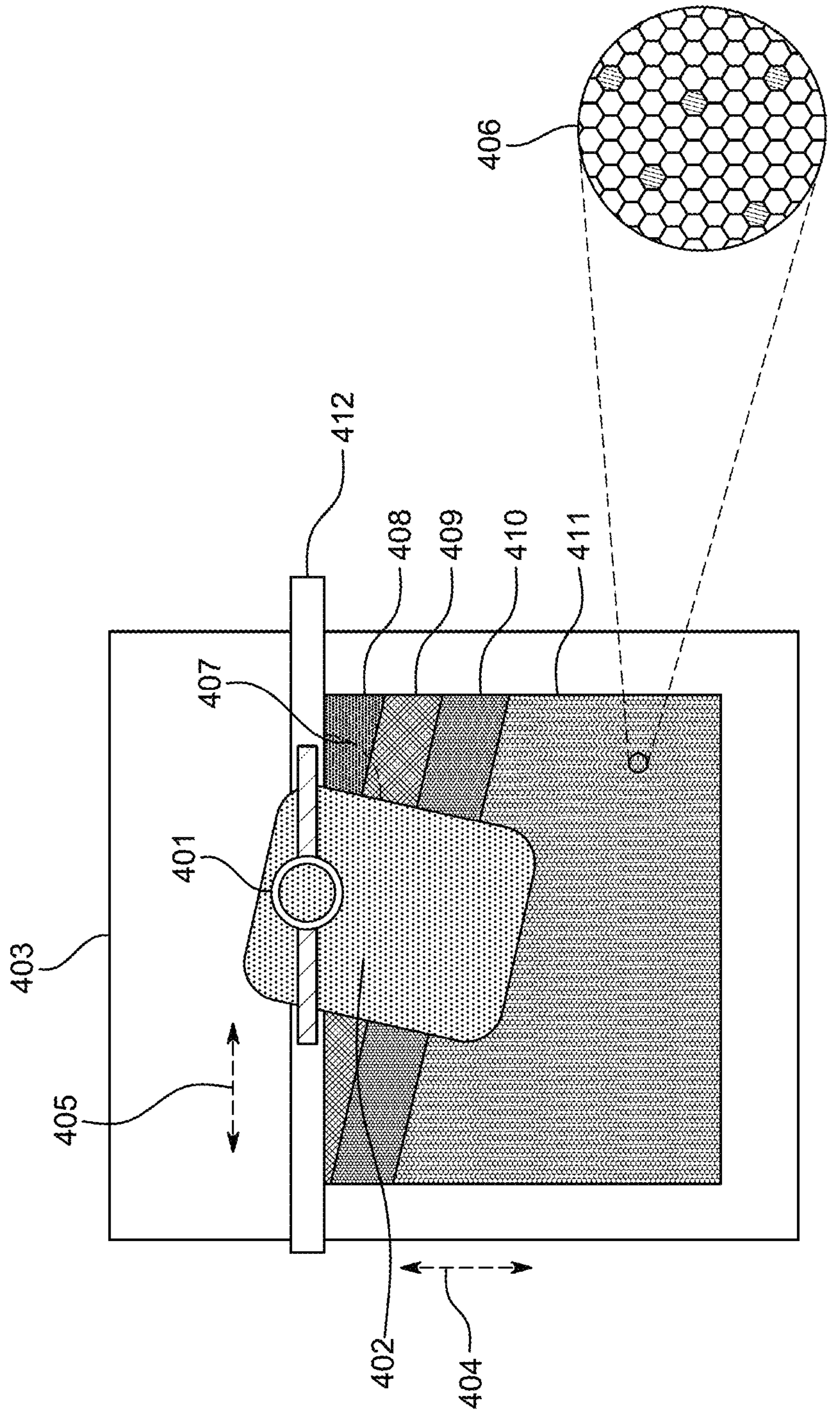
FIGS. 4A-B are plan views of a gantry schematic with linear motion in the x-axis and y-axis along with a rotation axis for the print array. These axes of motion are used to effect the required motion necessary for certain aspects of the current disclosure.

An embodiment of a printer with this capability is illustrated in FIG. 4A. This printer is analogous to the prior art printer illustrated in FIG. 2 with at least four important distinctions. First, the printer is equipped with a third axis of motion, a rotational axis 401, that can rotate the printer carriage 402 about an axis that is substantially perpendicular to the local plane created by print medium 403. A second important difference from the prior art is that the axis responsible for motion in the y-direction axis 404 is bidirectional whereas in the prior art the media motion is substantially unidirectionally. The third distinction from the prior art is that the y-axis motion 404 is not necessarily stationary during a printing pass. Instead, the y-axis 404 works in cooperation with the x-axis motion 405 to potentially create diagonal, horizontal, or vertical relative motion between the print medium 403 and the print heads within the printer carriage 402. The fourth difference between the current disclosure and the prior art is illustrated in view 406 that demonstrates the digital image being represented by non-square pixels. In the example of FIG. 4A, hexagonal pixels are used. The importance of using non-rectilinear pixels will become clear further in the discussion.

In the embodiment of FIG. 4A, the theta-z rotation axis is exercised to create an angle, 407, between the carriage rail and the long axis of the print array. The long axis of the print array is defined as the primary linear direction in which the nozzles of the print head are aligned. Many print heads have multiple columns of nozzles; connecting the nozzles within each column with line segments creates lines all parallel to the long axis of the print array. The angle 407 is chosen to be different from 90 degrees or 180 degrees for at least some of the print passes. In FIG. 4A the printing mode is again assumed to be a 4-pass printing mode so that 4 passes are required to complete a section of the print. During a printing pass, the x-axis linear motion 405 is used in conjunction with the y-axis linear motion 404 to create a diagonal relative motion between the print medium 403 and the printer carriage 402. During a first pass over the print medium, a partially completed area 408 is created. If the print angle 407 is left unchanged, a second pass will create a partially printed area 409 containing roughly half of the desired printed dots. Likewise, a third pass creates section 410 and a fourth pass will create a completed print section 411.

With respect to angles between printing directions discussed in the present disclosure, it should be understood by those skilled in the art to which the present disclosure pertains that such identified angles contemplate that there may be minor angle variations that do not impact the overall quality of printing in an appreciable manner while still falling within the contemplated methods.

Figure 4B:
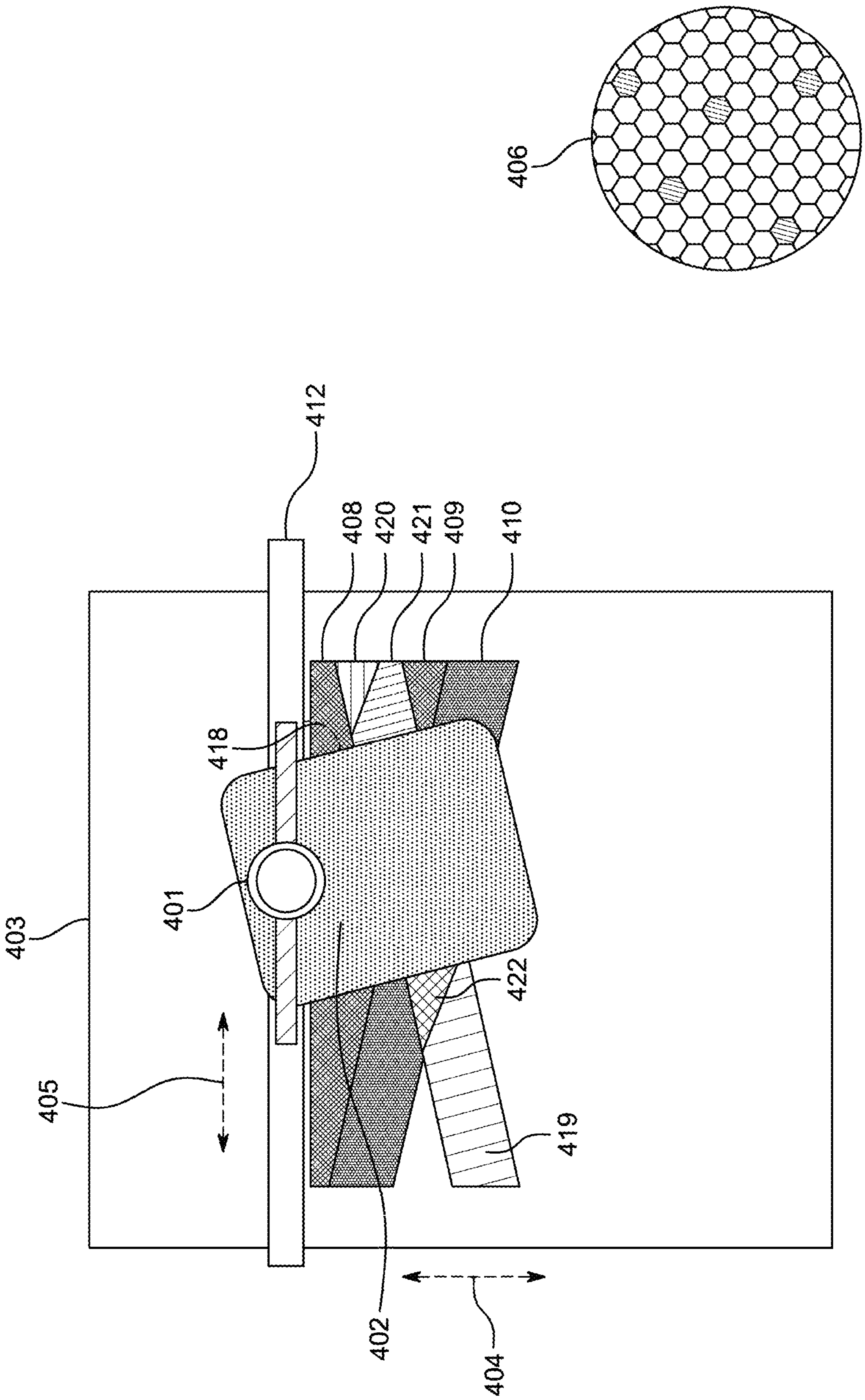

Printing in the manner described in FIG. 4A could still suffer from errors constructively interfering between passes because the print passes are essentially parallel to one another. FIG. 4B extends the concept illustrated in FIG. 4A by changing the print angle in between the different passes. In the example of FIG. 4B, the first three passes are printed using the print angle 407 shown in FIG. 4A. Collectively, they combine to create print sections 408, 409 and 410 as described above. Following the third pass, the carriage is rotated to print angle 418, different from print angle 407. The fourth pass will therefore create multiple regions on the print medium. Partially completed print area 419 is a section of the print medium where only the fourth pass has printed dots so far. Section 420 is a section of the print medium where the third pass and the fourth pass overlap and so roughly 50% of the desired dots will have been printed thus far. Section 421 is a section where the third, second, and fourth passes overlap thereby having roughly 75% of the desired printed dots printed thus far. Finally, section 422 is where all four passes overlap, and all the desired printed dots have been printed. By using different print angles to print each section of the print medium, constructive interference of print errors and the banding that results can be substantially reduced.

As described above the action of overlapping print areas printed via multiple angles during multiple passes may be described as partially complimentary (i.e., overlap to produce an image of better objective fidelity to the desired original imagine than possible with only printing along one angle during multiple passes).

There are multiple print systems and associated methods in which the 25 realized. A method that has been disclosed in the prior art, e.g. U.S. Pat. Pub. No. 2022/0032630, is the use of a robotic arm to translate the printer carriage over the substantially stationary print medium. A multi-axis robotic arm is well suited to the current disclosure: with a single arm, the motions of the x-axis, y-axis, and theta-z-axis can all be realized using off-the-shelf capability in commercial robots. Additionally, the same robot that transports the print heads can be used to load and unload print media into the print region. Different end effectors can be used for different types of media. By using the robot for all these motions significant cost savings can be realized.

Figure 5:
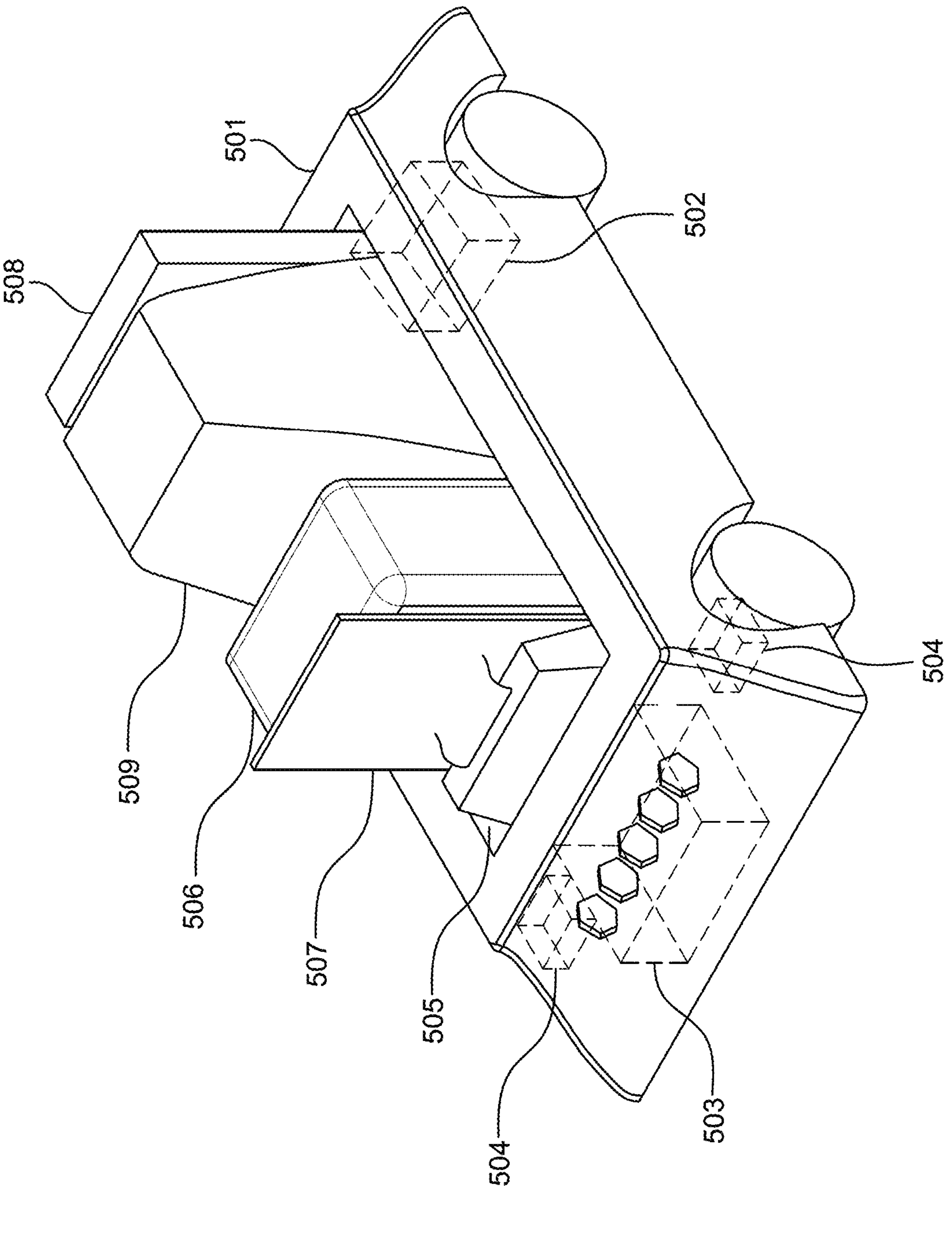
FIG. 5 is an isometric view of a print vehicle embodiment of the current disclosure.

Another embodiment capable of realizing the desired relative motions between printer carriage and the print medium is by providing a print vehicle (APV) that contains within it a means for locomotion, steering control, and the require components for printing. FIG. 5 illustrates one such concept. The vehicle 501 shown in FIG. 5 is a self-contained printer that can traverse across a print medium, guiding itself along that path, and print desired dots at the appropriate pixel locations during the traverse making a printing pass. It contains a propulsion system 502 that could, for example, be a stepper motor connected to the rear axle of the vehicle. While executing the printing pass, a means for determining the vehicle's location is provided to ensure the vehicle stays on the desired path. Optical encoder 503 may serve such a purpose as an example. An optical system on the vehicle might also be used to image dots printed on a previous pass to properly orient and track the vehicle before or during a printing pass. Other methods for determining location are many and could include providing a 2-D encoded magnetic plane in close proximity to the APV while equipping the vehicle with a magnetic read head. This magnetic plane could be placed underneath the print medium or, in the case of thick substrates or in cases where the underside of the substrate is unavailable (e.g., when printing a floor) or a barrier to a magnetic field (e.g., a metal or metallized substrate), the magnetic plane could be suspended above the printing vehicle. A third option could include providing one or more external cameras that monitor the position of the APV and wirelessly transmit updates to the vehicle to effect any corrections. Yet another option is to provide an optical component such as a reflector or prism on the vehicle that is tracked with a laser system in real time and can transmit position, trajectory, or correction vectors back to the print vehicle. The print vehicle is furnished with steering or direction control 504 that can adjust the print vehicle trajectory as necessary to keep the vehicle on the intended path during the print pass as well as, in conjunction with the propulsion system, reorient the vehicle to prepare it for a subsequent print pass.

Also contained within the printing device are all the required subsystems for the vehicle to print during a printing pass. A printing unit 505 such as an inkjet print head, can eject drops according to image data at the appropriate locations during the print pass. One or more print heads can be provided. For example, four print heads could be provided along with inks reservoirs and delivery systems 506 to print cyan, magenta, yellow and black color separations or portions of those separations all in a single pass. Ink reservoirs are used to hold a supply of ink for each color and the delivery system is responsible for supplying ink to the print head in a condition acceptable for printing. Multiple print heads could be provided to eject a single-color ink to increase the print resolution and/or the maximum possible traverse speed of the print vehicle. The print head is controlled by drive electronics 507 that contains memory for holding print image data, software for formatting that data to be printable by the print head, and electronics to coordinate the firing of the print head with the information relayed by the optical encoder 503. A curing and drying module 508 can also optionally be provided. For example, in the case of UV inks, the curing module could be a UV light emitter that can serve to fully cure or partially cure (pin) the inks. For solvent-based or water-based inks, the drying module can facilitate removal of the water or solvent to speed the drying process. Finally, a power supply module 509 is provided to power the various subsystems contained within the vehicle.

Such a vehicle is capable of printing onto a wide variety of substrates of different composition and, importantly, sizes. A printing system thus constructed is not constrained by the size of the gantry or a fixed print bar as is the case in the prior art's shuttle printers or single-pass printers, respectively.

A servicing unit can be provided separately from the device of FIG. 5. The servicing unit is where the APV can receive periodic maintenance, including performing servicing of the nozzle array to maintain reliable drop ejection, recharging onboard batteries, replenishing ink supplies, and other routine maintenance acts. Ideally the servicing unit contains interfaces that can facilitate reliable docking of the APV to the unit. These interfaces could include a wireless guidance approach (e.g., an optical or RF system) to guide the APV near the servicing unit then a mechanical guide on the servicing unit that mechanically interfaces with the APV to locate the APV with respect to the servicing unit.

Figure 6:
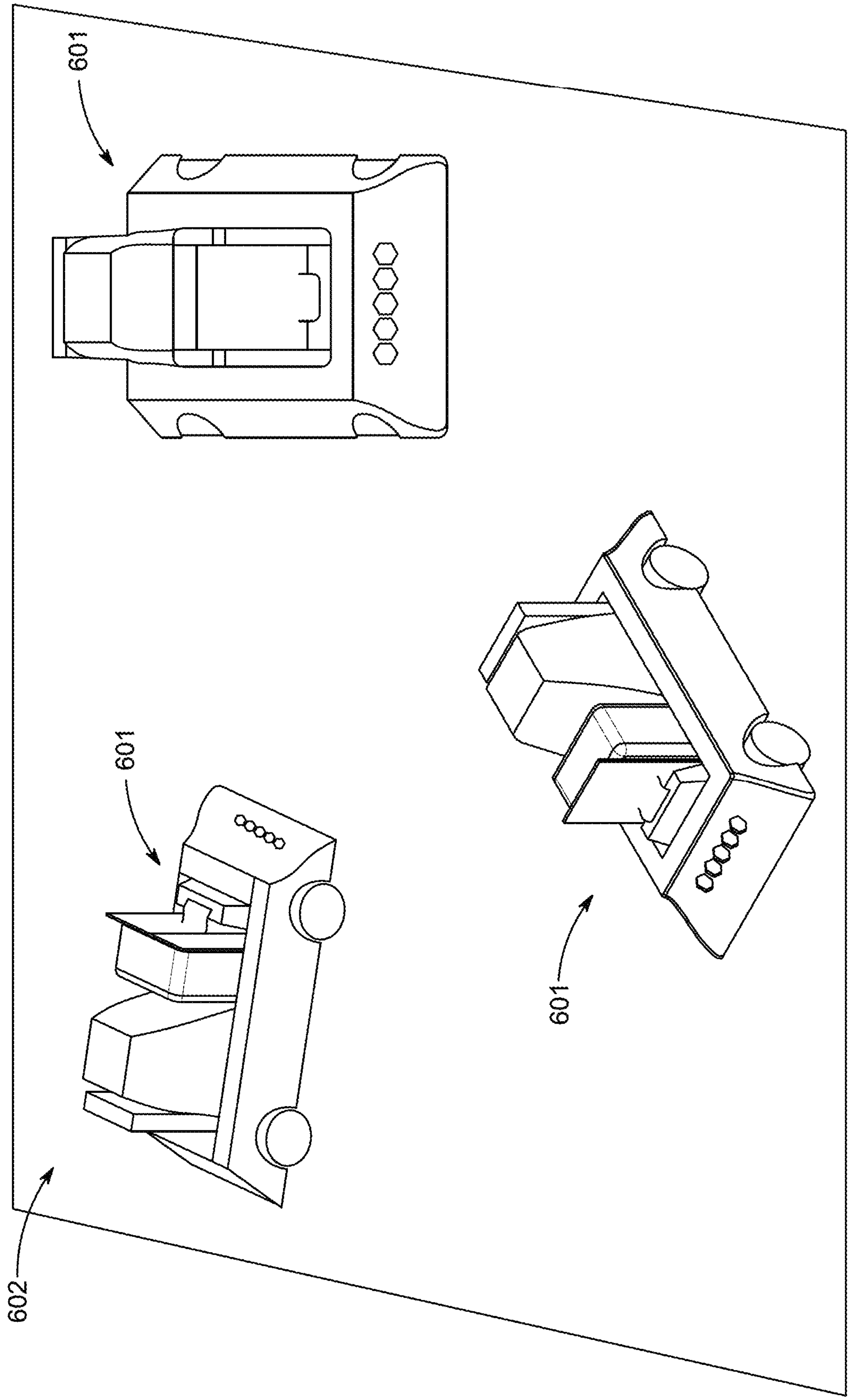
FIG. 6 is an isometric view that demonstrates how several automated print vehicles (APVs) can work in tandem on a single workpiece.

A vehicle such as depicted in FIG. 5 could operate independently or could work cooperatively with other print vehicles as shown in FIG. 6. This "swarm" of print vehicles 601 printing a single workpiece 602 would increase the productivity over that of a single print vehicle and their movements and operations can be coordinated to maximize the printing rate and ensure no collisions. Such coordination could be achieved with bilateral communications between the vehicles or through a central computer system that coordinates and communicates with the different vehicles within the swarm. Optimization algorithms can be applied to maximize the productivity of each vehicle and, for example, to ensure adequate dry time between when a pass was printed and the next pass that would encounter the printed ink of a previous pass. An embodiment as shown in FIG. 6 illustrates a wide range of scalability of the present disclosure.

As the print vehicles are optionally equipped with a drying or curing component, a further extension of the swarm of print vehicles is to provide curing vehicles that do not print but serve to dry or cure the ink on the substrate, or, in the case the print vehicles only partially dry or cure the ink during a printing pass, to more fully dry or cure the ink.

Figure 7:
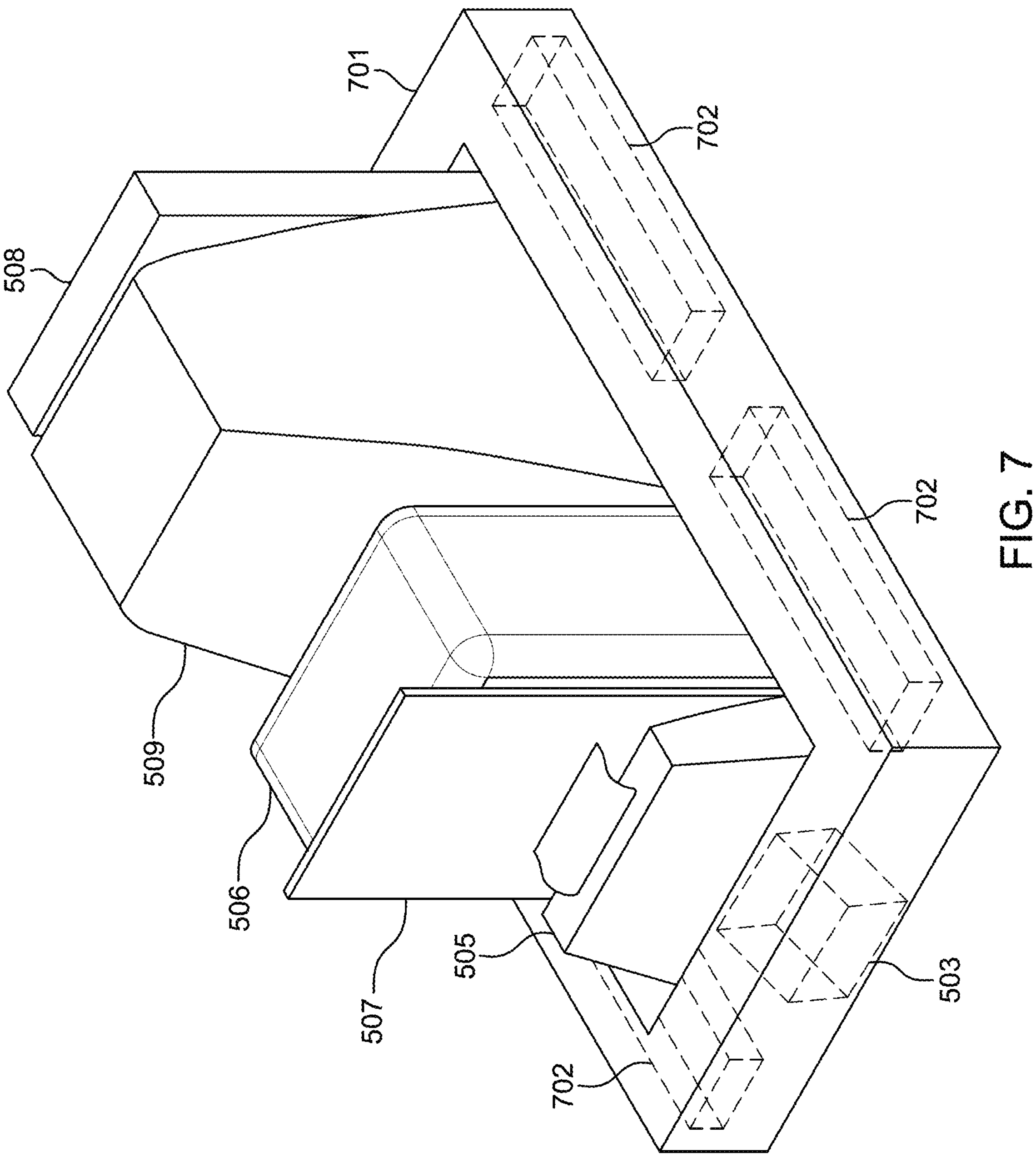
FIG. 7 is an isometric view of a magnetic levitation mover plate that acts as the print vehicle.

Alternative means of propulsion may be used for print vehicles. The mover 701 in FIG. 7 is one such example. In this case the vehicle body is simply a plate that contains one or more permanent magnets 702. The print medium is placed on top of a table that contains conductive coils. Current is caused to flow through the coils, creating an electromagnetic force between the coils and the permanent magnets. Controlling the current through each coil can orient and propel the mover as desired. Depending on the system, location information could also be generated making the optical encoder 503 superfluous.

While the rectangular or square raster of the prior art has been used effectively for many years, it can be shown to be inadequate for the present disclosure. The prior art, e.g., U.S. Pat. No. 9,764,573, gives motivation for printing passes in different angles, but its methods can be shown to severely limit the productivity of the system. Consider, for example, the two square print rasters shown in FIGS. 8A-B. Each of the rasters indicate which pixels are addressable, i.e., printable, during a printing pass using a print head with the same resolution as the output print, approaching the printing raster from different angles. For the purposes of FIGS. 8A-B, we deem a pixel to be addressable if the center of a nozzle passes over the center of that pixel. The print rasters are all 600 dpi as is the print head. If a pixel is colored white, it indicates that pixel is addressable on a print pass with the print head orientation and traverse direction shown in the figure; i.e., a white pixel meets the definition of being addressable as defined here.

Figure 8A:
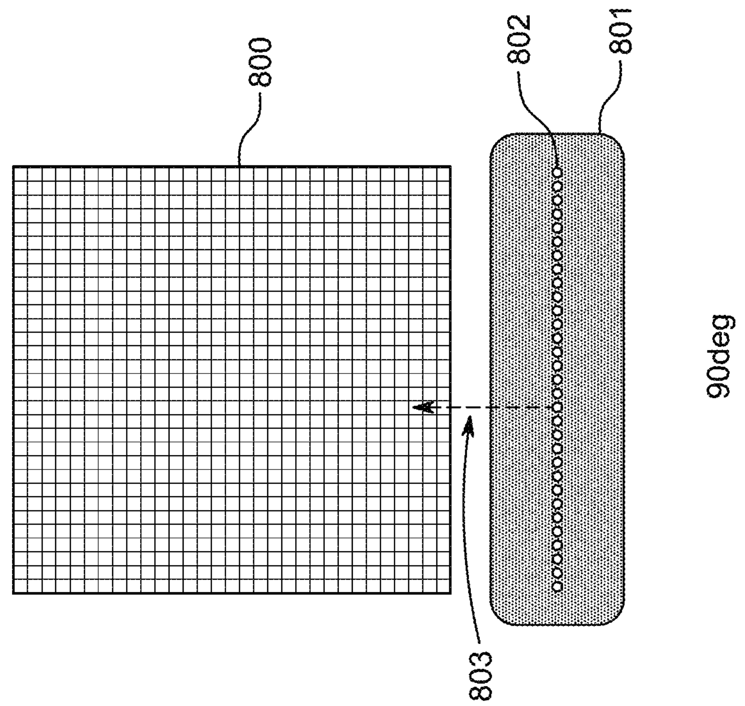
FIG. 8A PRIOR ART
FIGS. 8A-D schematically show the pixel addressability of a square raster when traversed in various print directions and orientations.
Figure 8B:
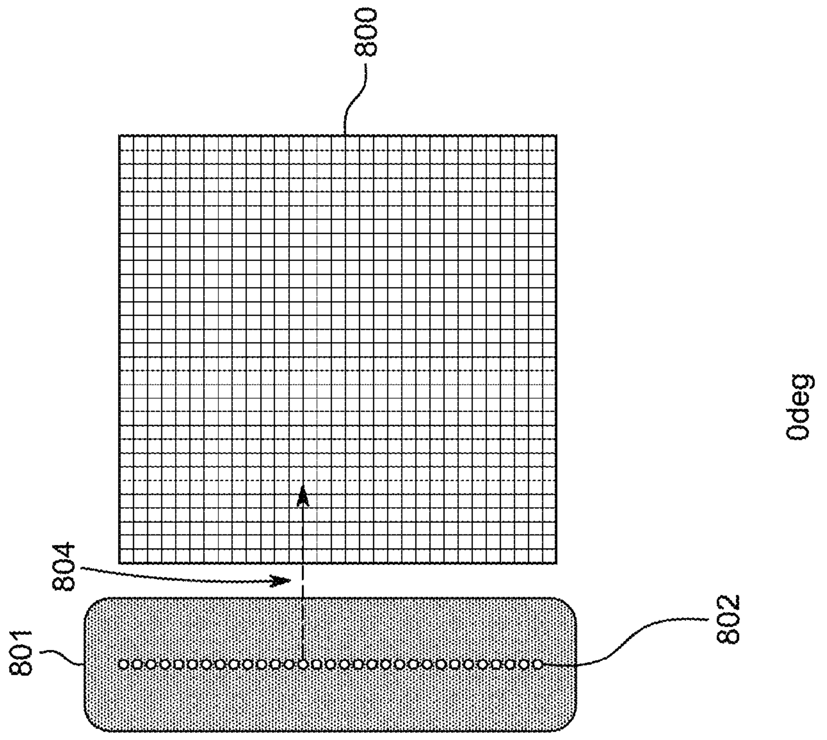
FIG. 8B PRIOR ART

FIG. 8A and FIG. 8B show two conditions for which the square raster is well suited. As can be seen, all pixels in the square raster 800 are printable by the print head 801 having nozzles 802 traversing in the print direction 803 or 804 indicated by the dashed arrows. As illustrated, each nozzle aligns well with a column (FIG. 8A) or a row (FIG. 8B) of pixels. Indeed, this is why a square raster as shown in FIGS. 8A-B is well suited for the prior art.

Figure 8C:
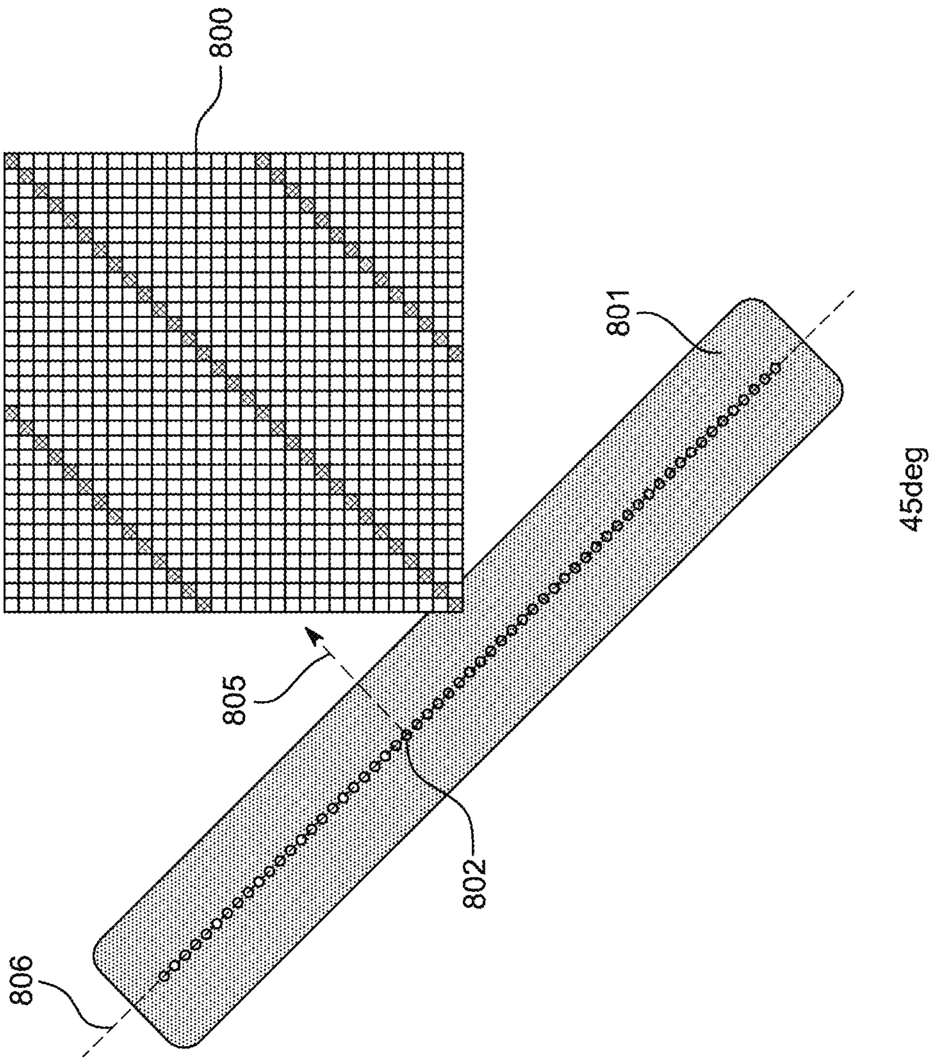
FIG. 8C PRIOR ART
Figure 8D:
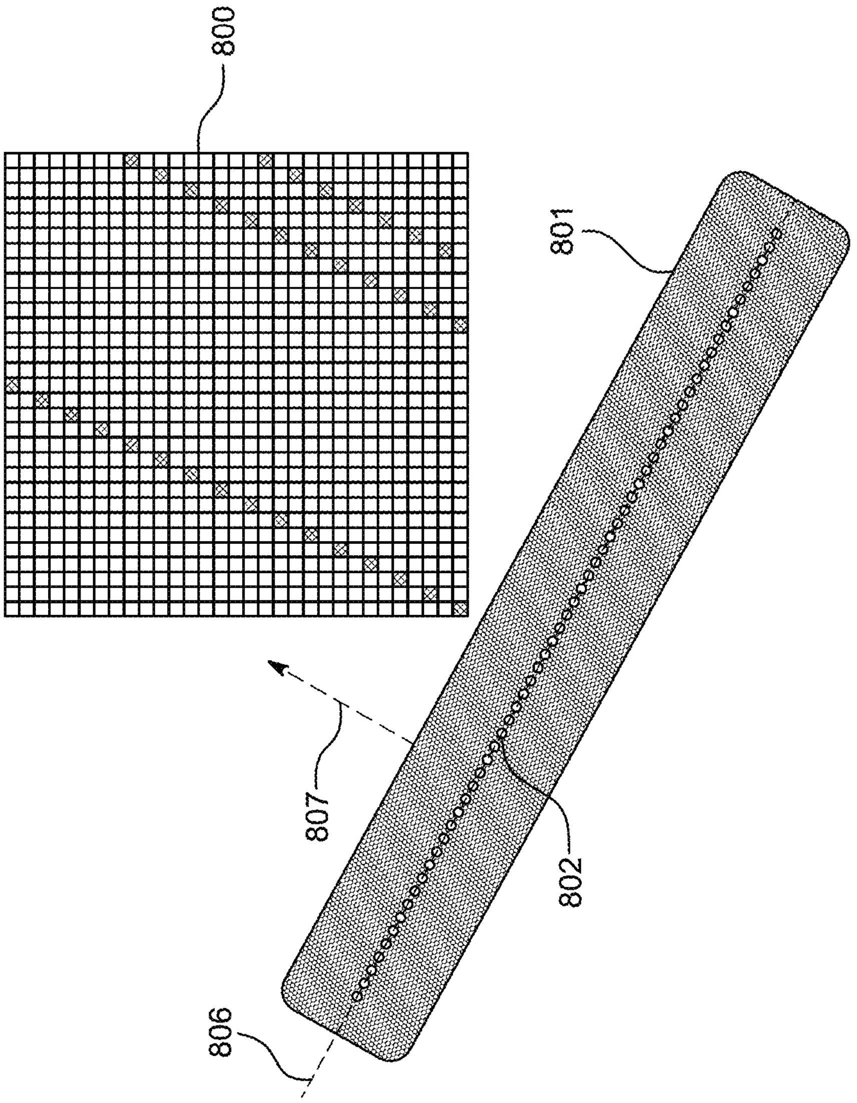
FIG. 8D PRIOR ART

FIG. 8C and FIG. 8D illustrate what happens when the print head addresses the square raster from an angle other than 0, 90, 180, or 270 degrees. Because the spacing between pixels no longer matches the spacing between the nozzles, only a small fraction of the pixels are addressable on the depicted printing pass. U.S. Pat. No. 9,764,573 supplies a relationship that gives desired angles between print passes, alpha, namely, "alpha=arc tan(n*b/m*I) where b=the distance between two adjacent nozzles of a print head, I=the distance between two successive printed dots in the direction of movement of the print head and n,m=natural numbers." For simplicity, choose b=I. Table 1 gives alpha for a few select values of n and m.

TABLE 1

| n | m | alpha, degrees | Fraction approximately addressable to within 1 micron | Fraction approximately addressable to within 5 micron |
|---|---|---|---|---|
| 1 | 1 | 45 | 6.1% | 21.3% |
| 1 | 2 | 26.565 | 3.6% | 23.9% |
| 2 | 1 | 63.435 | 3.6% | 23.9% |

If a first pass is chosen as zero degrees, by way of example, the orientation of the square raster is determined to have the same orientation shown in FIGS. 8A-B. FIG. 8C shows the pixels that are approximately addressable by a second printing pass with a print direction 805 of 45 degrees and the direction nozzle array 806 kept perpendicular to print direction 805. Here "approximately addressable" means that the center of the nozzle passes in close proximity to the center of the pixel, but not necessarily coincident. For the purposes of FIGS. 8C-D the center of a nozzle must pass within one micron of the center of a pixel for that pixel to be considered approximately addressable, and those printable locations are shaded in FIGS. 8C-D. As can be readily seen in raster 800, only a small number of nozzles align with the raster because the spacing between the nozzles no longer matches the spacing between the pixels when approached with an angle of 45 degrees. In fact, as shown in Table 1, in this example only approximate 6.1% of the pixels are approximately addressable. Likewise, when printing with a first angle of zero degrees and a second pass at a relative angle of 26.565 degrees only 3.6% of pixels are addressable during that second pass. As a final example and as illustrated in FIG. 8D, printing a second pass with a print direction 807 having a relative angle of 63.435 degrees can only address 3.6% of the raster 800 as shown in Table 1 and illustrated in FIG. 8D. For the purposes of the present disclosure, references to the percentage of the raster locations defined in the printing raster that are capable of being printed refer only the portion of the raster over which the nozzle array translates during a printing pass. (i.e., 25% of the raster locations defined in the printing raster are capable of being printed by the printing unit during each of the first printing pass and the second printing pass excludes those portions of the raster over which the nozzle array is not traversed).

Clearly this would impact productivity significantly. To reduce this impact, one might be tempted to increase the permissible tolerance to deem a pixel approximately addressable by a nozzle. While this introduces a systematic dot placement error that can negatively impact print quality, the final column in Table 1 shows that increasing this tolerance to five microns for a 600 dpi print system (more than 10% the size of a pixel), the approximate addressability only improves marginally. This low approximate addressability would still constrain productivity on top of the additional systematic dot placement error it introduces.

As it is a critical feature of the present disclosure to print overlapping regions of a printed workpiece using print directions from multiple angles on separate printing passes while preserving high utilization of the print head nozzles, it is needed to define an alternative printing raster other than one having square or rectangular pixels or, alternatively, address those square or rectangular pixels in a novel way. It can be shown (Asharindavida et al) that there are only three regular tessellation patterns, where a regular tessellation pattern is defined as a regular (i.e., uniform) pattern that can tile a flat plane without overlap or gaps between the tiles. These are: a square/rectangular tessellation, a triangular tessellation, and a hexagonal tessellation. A raster based on tiled patterns of hexagonal pixels, a hexagonal raster, is attractive as a means for representing digital image data as explained previously. In the context of inkjet printing, the hexagonal raster presents two further advantages: ink efficiency and its equidistant property enables efficient printing from multiple print directions consistent with the objectives of the present disclosure.

Figure 9B:
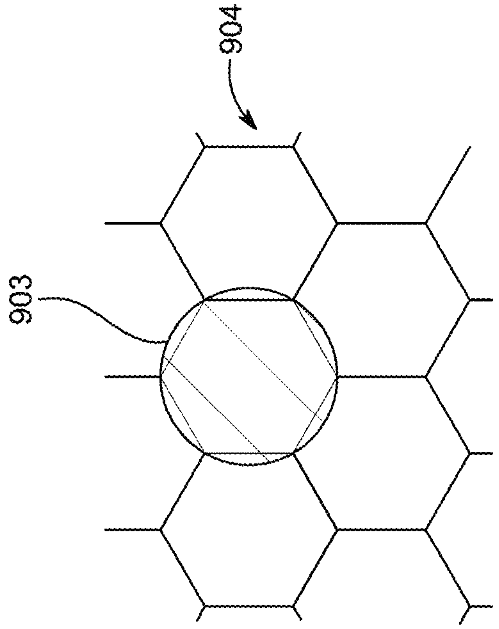
FIGS. 9A-B illustrate the prior art raster (FIG. 9A) and the hexagonal raster (FIG. 9B) typical of the current disclosure.
Figure 9A:
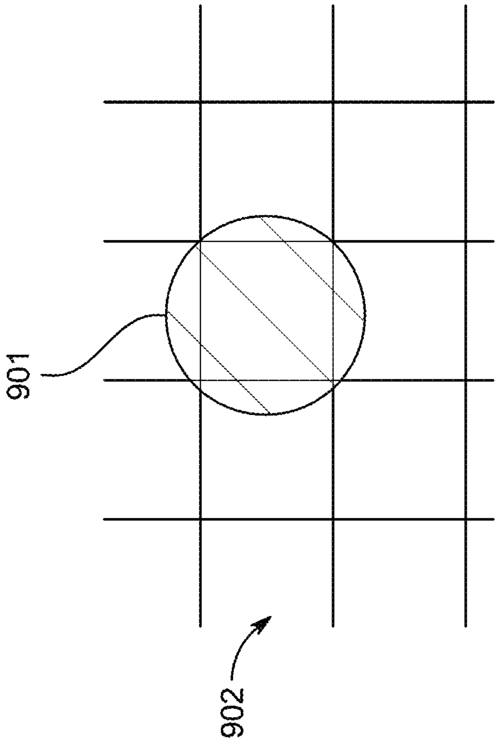
FIG. 9A PRIOR ART

FIG. 9 illustrates the benefits of using a hexagonal raster compared to a square raster when printing with substantially round dots as is the case in inkjet printing. It is a critical feature for good color reproduction that an ink dot be able to completely circumscribe a pixel. Failure to completely cover the pixel means that the surface of the print medium will be exposed; this will substantially reduce the color gamut the printing system can achieve while it also increases sensitivity to any source of dot placement error. As illustrated in FIG. 9B, the hexagonal raster is a closer match to the shape of the round dot. FIG. 9A shows a minimum circumscribed dot 901 for the square raster 902 and simple calculations can show the area of the dot exceeds the area of the square pixel by approximately 57%. Meanwhile, the circumscribed dot 903 for the hexagonal raster 904 in FIG. 9B exceeds the area of the hexagonal pixels by approximately 21%. This results in less overall ink being required by the hexagonal raster to meet the same print quality as achieved in the conventional square raster. It can be shown that this savings could be as large as 30% reduction in volume of ink usage for a well-tuned system with accurate dot placement.

Figure 10A:
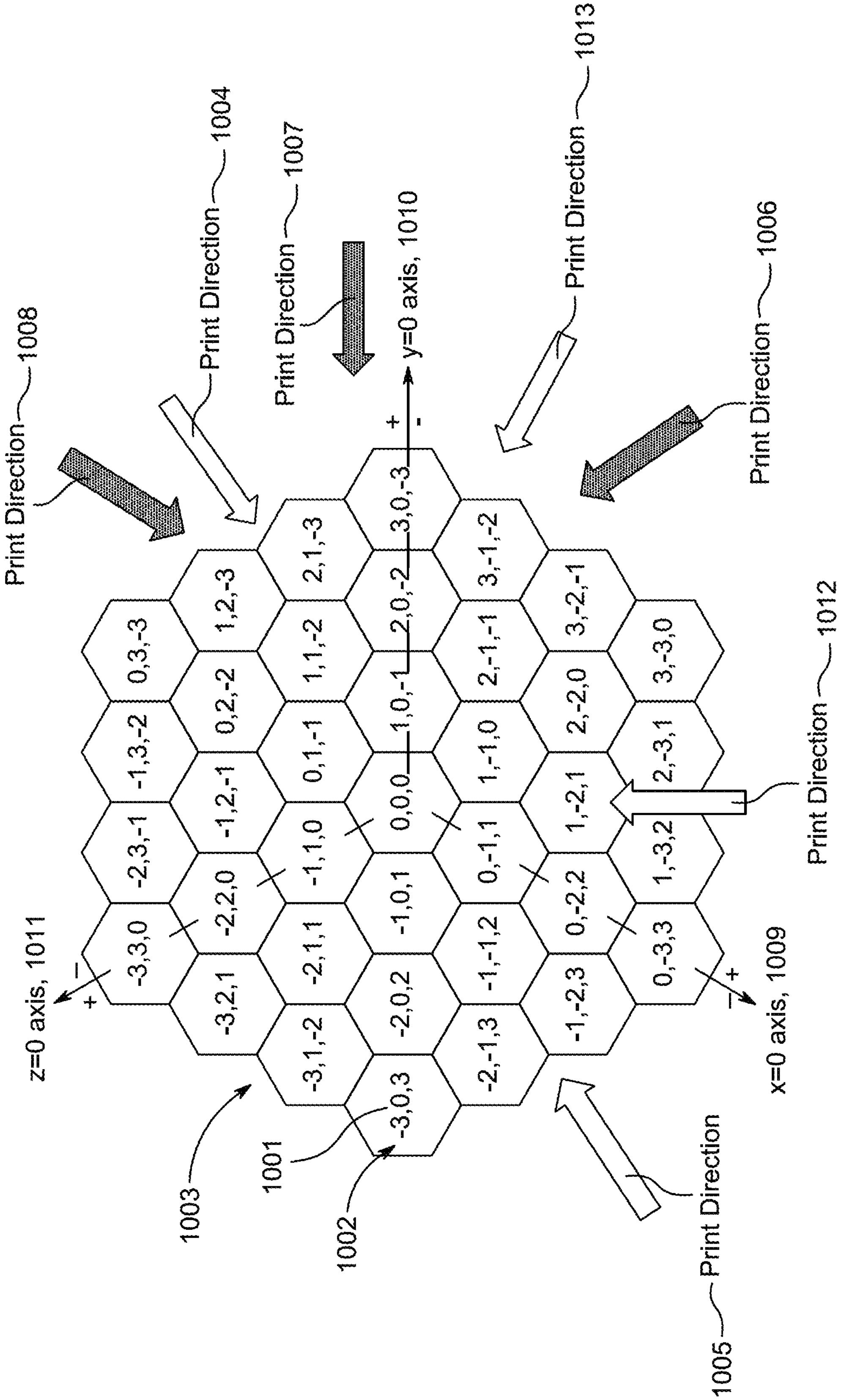
FIG. 10A is a schematic that exemplifies the coordinate system used on the hexagonal raster as well as the different print direction angles consistent with the current disclosure.
Figure 10B:
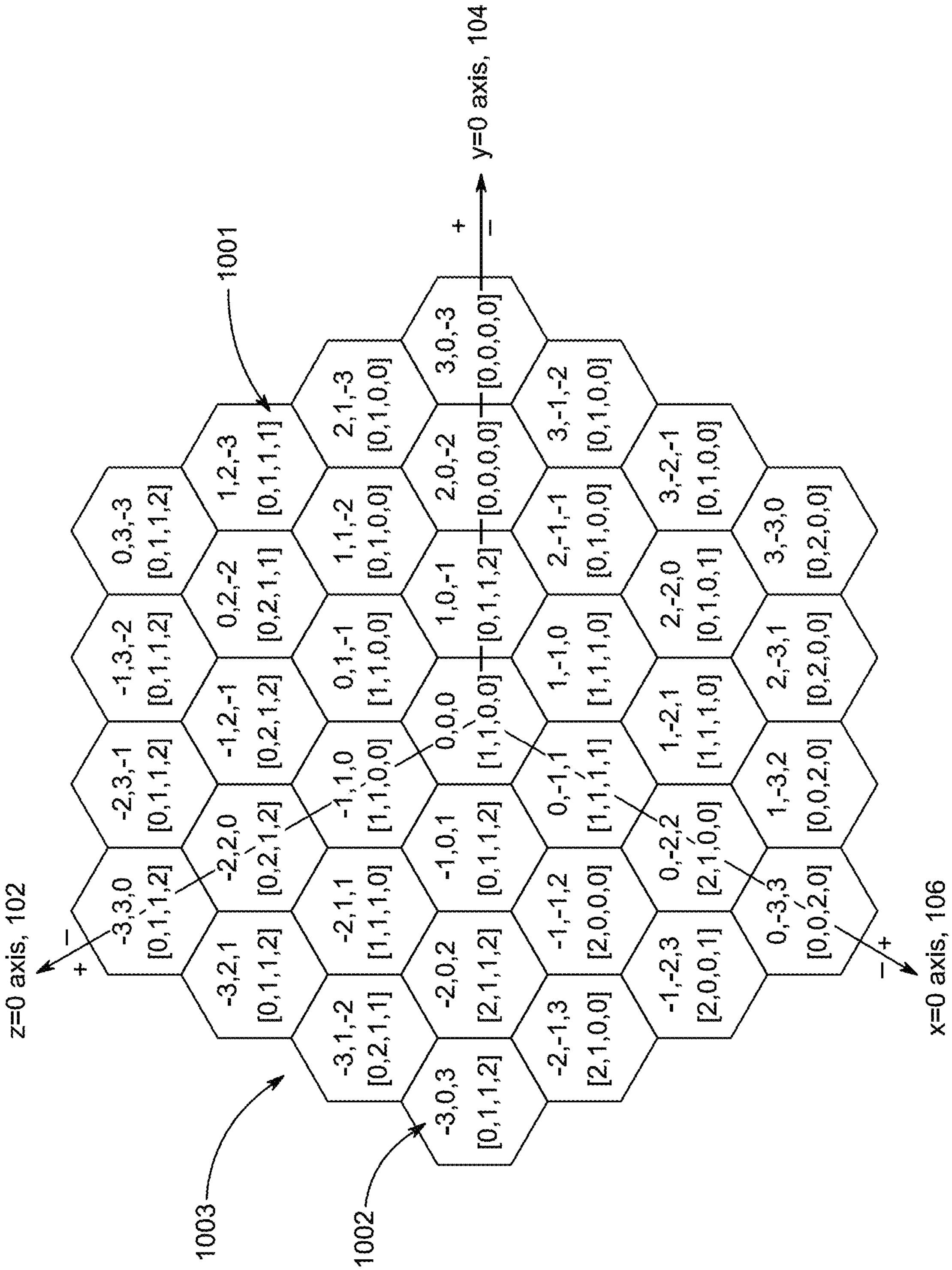
FIG. 10B shows an exemplary hexagonal raster with each raster pixel location associated with digital image data.

A critical advantage of the hexagonal raster when it comes to inkjet printing is its ability to support printing a given region of a print from multiple print directions while maintaining high nozzle usage. This gives the benefit of reducing sensitivity to printing errors while enabling high productivity. A hexagonal raster is illustrated in FIG. 10A. A hexagonal raster does not conform to a Cartesian set of coordinates, so the approach defined by Her is used to define the x, y, and z pixel coordinates and axes. Just as with a square raster, a hexagonal raster is fully capable of storing digital image data associated with each pixel. A four-color digital image example is thus illustrated in FIG. 10B where the pixel code values 1001 representing a three-level CMYK image are shown for each pixel having an x, y, z coordinate 1002 on an exemplary hexagonal raster 1003.

Turning back to FIG. 10A, also illustrated are six effective print direction angles for the hexagonal raster 1003. Each print direction approaches the hexagonal pixels at an edge or one of the vertices. Each print direction also has an opposite angle 180 degrees rotated from itself, exemplified by print direction 1004 and print direction 1005. Using these opposite directions is equivalent to bi-directional printing in the prior art and therefore creates a total of twelve different directions in which a hexagonal raster can be printed.

When printing a hexagonal raster with a print head of fixed resolution (as is the case for all inkjet print heads), the different print directions (and their reverse directions) fall into two different groupings. Print directions from within a group are most effective when combined because they have the same spacing between pixel centers in a direction orthogonal to the print direction. Print directions 1006, 1007, and 1008 that approach pixels at an edge and are parallel to one of the x-axis 1009, y-axis 1010, or z-axis 1011 shown in FIG. 10A form one group, Group A, along with their reverse directions. Print directions 1004, 1012, and 1013 that approach pixels at a vertex form a second grouping, Group B, along with their reverse directions, e.g., print direction 1005. When printing with Group A print directions, a hexagonal raster will preferentially have pixel spacing equal to $2/k/\sqrt{3}/NPI$ where NPI is the native resolution of the print head, e.g., specified in nozzles-per-inch, and k is a natural number greater than zero. For example, if a print head has resolution of 600 nozzles-per-inch, a hexagonal raster efficiently printed by Group A print directions will have a spacing of 48.88 microns or 519 dpi for k=1. When printing with Group B print directions, a hexagonal raster will preferentially have pixel spacing equal to 2/k/NPI. For example, a hexagonal raster printed with Group B print directions will have a resolution of 600 dpi for a print head having 600 nozzles per inch for k=2.

Printing in this manner allows for very effective use of nozzles within the print head while fully allowing printing of the print medium in several different non-orthogonal directions. For k=1, all pixels are addressable in all three print directions (and their reverse directions) when printing a hexagonal raster using either Group A print directions or Group B print directions. This is in stark contrast to the low nozzle usage presented in Table 1 when printing a square raster at an angle other than 0, 90, 180, and 270 degrees. Furthermore, the hexagonal raster printing does not introduce any systematic dot placement error—i.e., the nozzle centers are capable of passing directly over all the pixel centers, again in contrast to the square raster case. Tables 2a and 2b illustrate the pixel addressability for a hexagonal raster printed in Group A or Group B print directions. Angles are measured counterclockwise from the y=0 axis, 1004, of FIG. 10A. It should be noted that the angles in Table 2 are relative to the coordinate scheme chosen here; it should be seen as equivalent if a different set of axes are chosen that produce different values of the angles provided below while still approaching the hexagonal raster in the equivalent relative directions. A pixel is defined to be addressable if the center of a nozzle nominally passes directly over the center of the pixel during a pass. Those skilled in the art recognize small mechanical errors will cause these two centers to deviate in actual practice; for the purposes of defining addressable, these errors are ignored.

TABLE 2a

| Group A print directions, k = 1 | |
|---|---|
| Angle, degrees | Fraction pixels addressable |
| 0 and 180 | 100% |
| 60 and 240 | 100% |
| 120 and 300 | 100% |

TABLE 2b

| Group B print directions, k = 1 | |
|---|---|
| Angle, degrees | Fraction pixels addressable |
| 30 and 210 | 100% |
| 90 and 270 | 100% |
| 150 and 330 | 100% |

Figure 11:
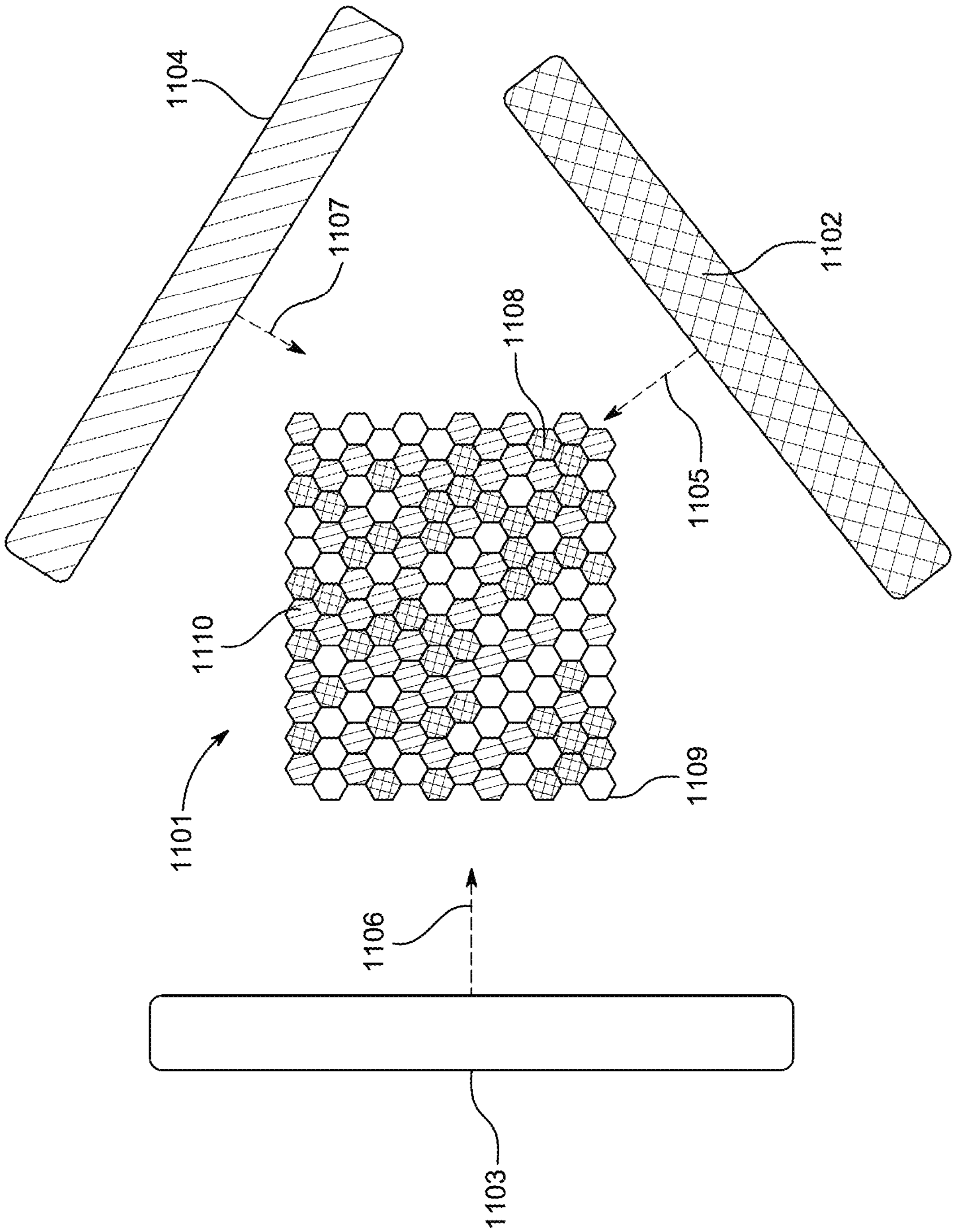
FIG. 11 shows the stochastic distribution of printing of pixels amongst three non-parallel and non-orthogonal print directions.

An additional benefit of this high addressability is that a pixel can be printed by any of the three directions (and their reverse directions) within a group of print directions. This gives the printer designer great flexibility in assigning which pixels to print on a given print direction. This flexibility lends itself to stochastically mixing dots printed from the different directions thereby hiding defects even more thoroughly. FIG. 11 illustrates how passes from the three different print directions belonging to Group A, can be used to print all pixels in the hexagonal raster 1101 with k=1. As illustrated, printing of the pixels can be stochastically selected from the first pass, second pass, or third pass. FIG. 11 shows the print head in three different orientations, 1102, 1103, and 1104 and traversing across the hexagonal raster 1101 in three respective directions indicated by dashed arrows: 1105, 1106, and 1107. These orientations and directions coincide with the print directions (or one of their reverse directions) illustrated in FIG. 10A that belong to Group A. Pixels 1108 are printed while the print head is in orientation 1102 and moving in direction 1105. Likewise, pixels 1109 are printed while the print head is in orientation 1103 and moving in direction 1106. Finally, the remaining pixels 1110 are printed on the third and final pass while the print head is in orientation 1104 and moving in print direction 1107. Those skilled in the art will recognize a multitude of ways to distribute the pixels to the different passes. Random distribution is but one of those methods. Printing the hexagonal raster using directions from Group B happens in an analogous fashion.

Small images, images that can be spanned by the print head in a single pass, have been chosen for these simple examples to illustrate the key concepts. As one skilled in the art will recognize, the method of printing described here is equally effective when printing larger images, i.e., images larger than the span of the print head. The printing of one section of the image during one pass may abut the section of the image printed on another pass and thereby the entire image can be printed. The present disclosure is well suited to making these regions of abutment less visible since many passes intersect at non-parallel angles. Other methods to interleave passes to make the area of abutment even less observable are well known to those skilled in the art.

Figure 12:
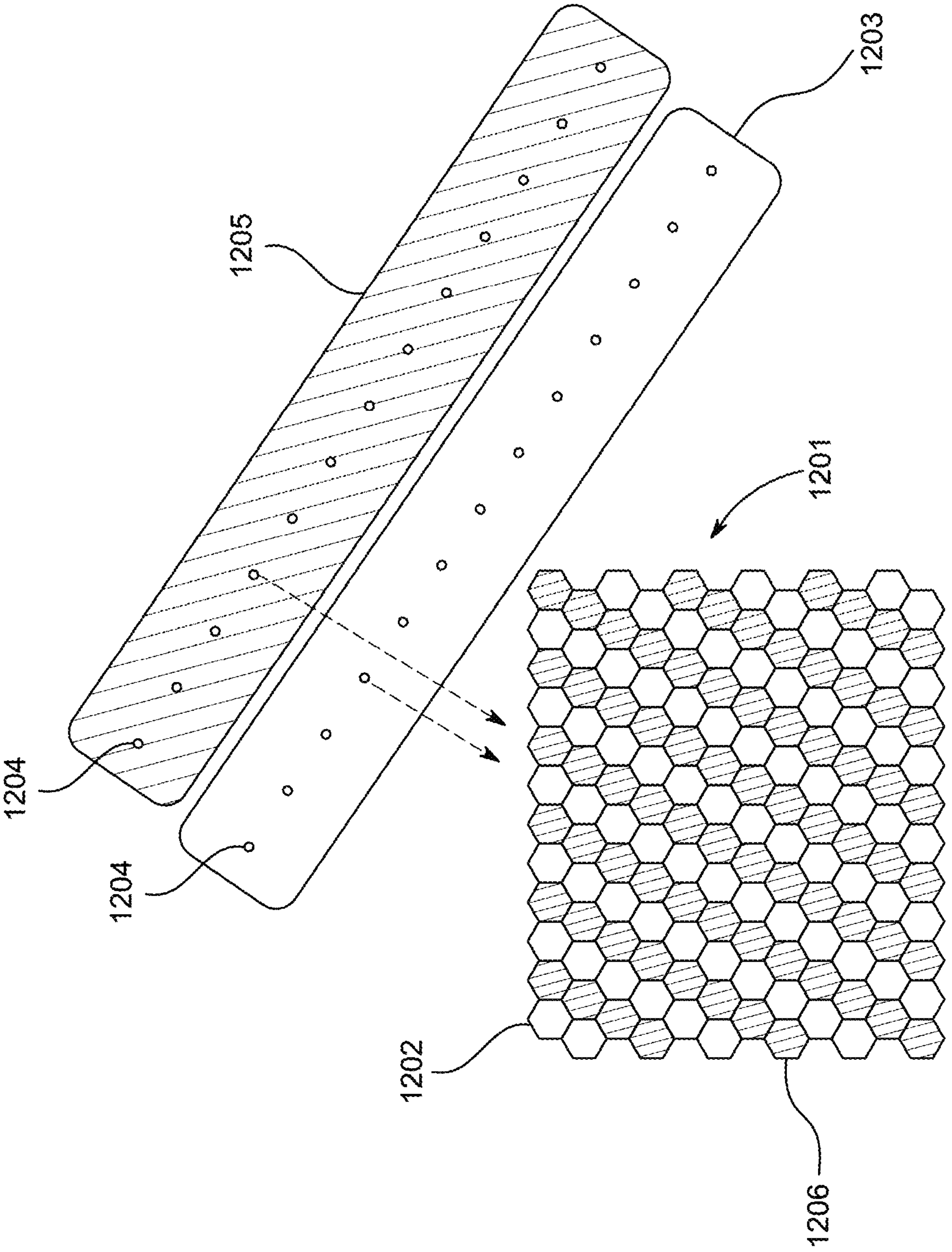
FIG. 12 illustrates printing by interleaving a single print direction to create printed output having higher resolution than the native resolution of the print head.

Higher resolution printing is possible by selecting higher values of k. For example, choosing k=2 and printing with Group A print directions using a 600 dpi print head yields a hexagonal raster with pixel spacings roughly equivalent to 1039 dpi. In this case, half of the pixels are addressable on a single print pass; a subsequent pass is used to interleave the first pass in order to print all the pixels. One example of this interleaving is shown in FIG. 12, using only a single print direction 1008 from FIG. 10A. In FIG. 12, the hexagonal raster, 1201, is patterned to illustrate how each pixel is printed. Pixels 1202 are printed on a first pass with the print head with orientation and starting position 1203 and traveling in the direction of the dashed arrow. As can be seen, the nozzles 1204 on the print head align with pixels 1202. On a second pass, the nozzles are offset slightly to permit addressing the other half of the pixels. Starting at position 1205, the print head travels in the direction of the dashed arrow and prints pixels 1206, completing this section of the print.

Figure 13:
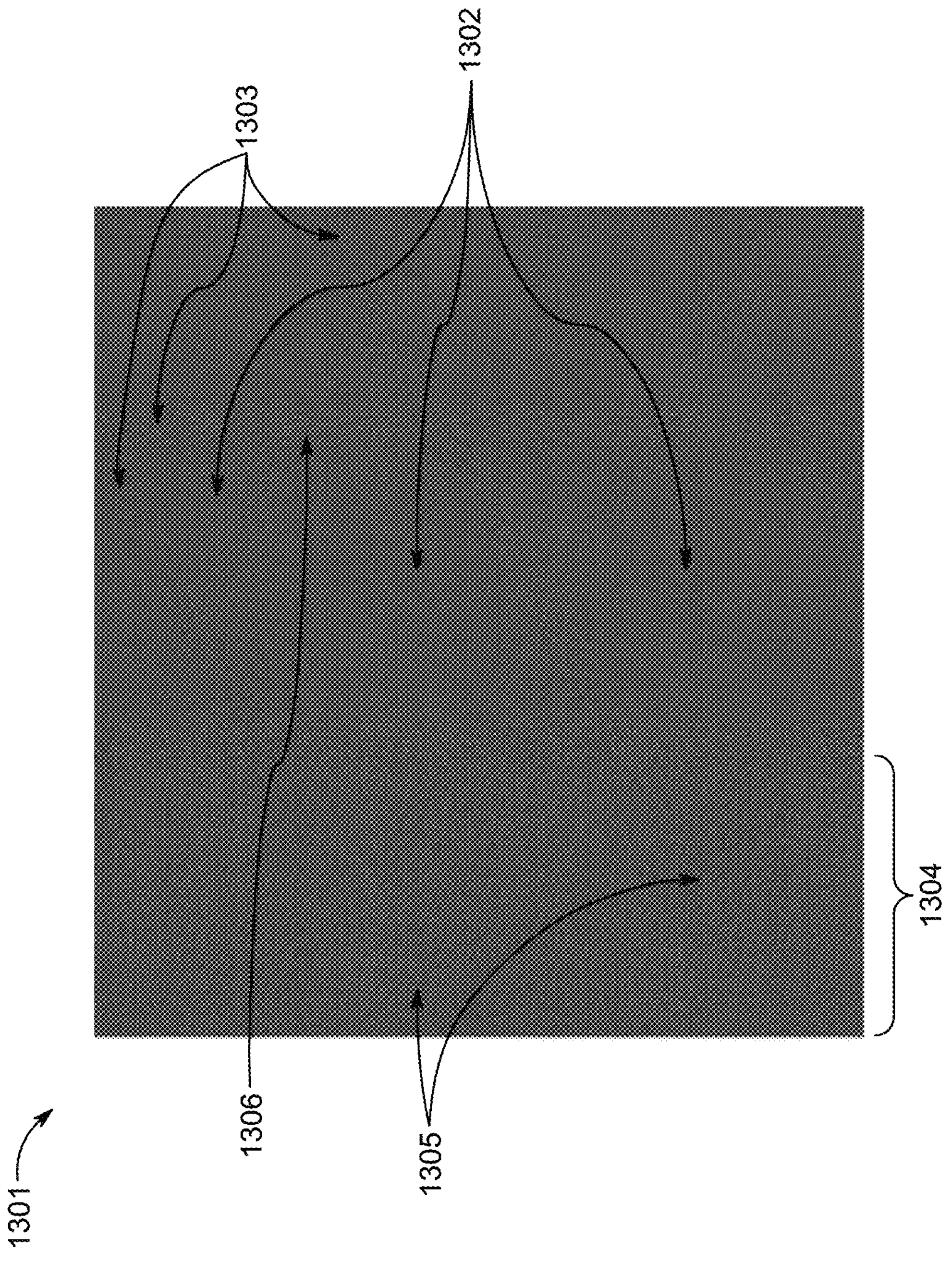
FIG. 13 is a simulation of a print created by a print system employing the present disclosure when the print system contains two types of dot placement error, the same errors as present in FIG. 3.

With the important features of printing method of the present disclosure now described, we apply this method to a printing simulation. The same errors as used to create the simulation of the prior art shown in FIG. 3 are now used in a simulation using the present disclosure. FIG. 13 presents this simulation of a print using a six-pass print mode, two passes from each of the print directions in Group A defined in FIG. 10A. Therefore, the total number of passes over a section of the print medium is the same for FIG. 13 as it was for the prior art shown in FIG. 3 and the total number of passes to complete the entire print is also equal to the prior art. Likewise, the amount of ink used per unit area is kept constant between the two simulations.

The first thing to notice when observing print 1301 in FIG. 13 is the lack of the horizontal banding that plagues the simulated print in FIG. 3. A much smoother and more uniform print is created using the methods of the present disclosure compared to the prior when both systems are presented with the same printing errors.

While print 1301 of FIG. 13 is more desirable and pleasing than print 301 of FIG. 3 and represents a significant improvement, close observation will show minor print defects associated with the print errors included in the simulation. A first observation is that the minor defects present in print 1301 are not horizontal but rather follow a vertical or diagonal direction. Naturally these directions coincide with the print directions selected for this simulated print. Areas 1302 in print 1301 are the smoothest areas and correspond with the sections of the print where only small, random errors are present in the simulation. Areas 1303 show slight bands in the vertical and both diagonal directions. These areas are impacted by the stitch error introduced into the simulation. Area 1304, a broad vertical band on the left of print 1301, is the section of the print impacted by the step error introduced on pass 6 of the simulation. Areas 1305 are those sections where the step error and stitch error are both present. Importantly, the constructive interference causing the significant banding of print 301 of FIG. 3 in areas 302 is not observed. Finally, area 1306, a small triangular section of the print, points out an area where the stitch error from two separate passes overlap. A change in texture is observed, but only a minor change in lightness is observed because the two passes are executed in different print directions and therefore the error does not substantially constructively interfere. So, while some minor defects are observed in simulated print 1301 of FIG. 13, the varied print directions employed by the present disclosure prevent strong constructive interference of the different types of print errors, resulting in improved print quality without loss of productivity.

Figure 14:
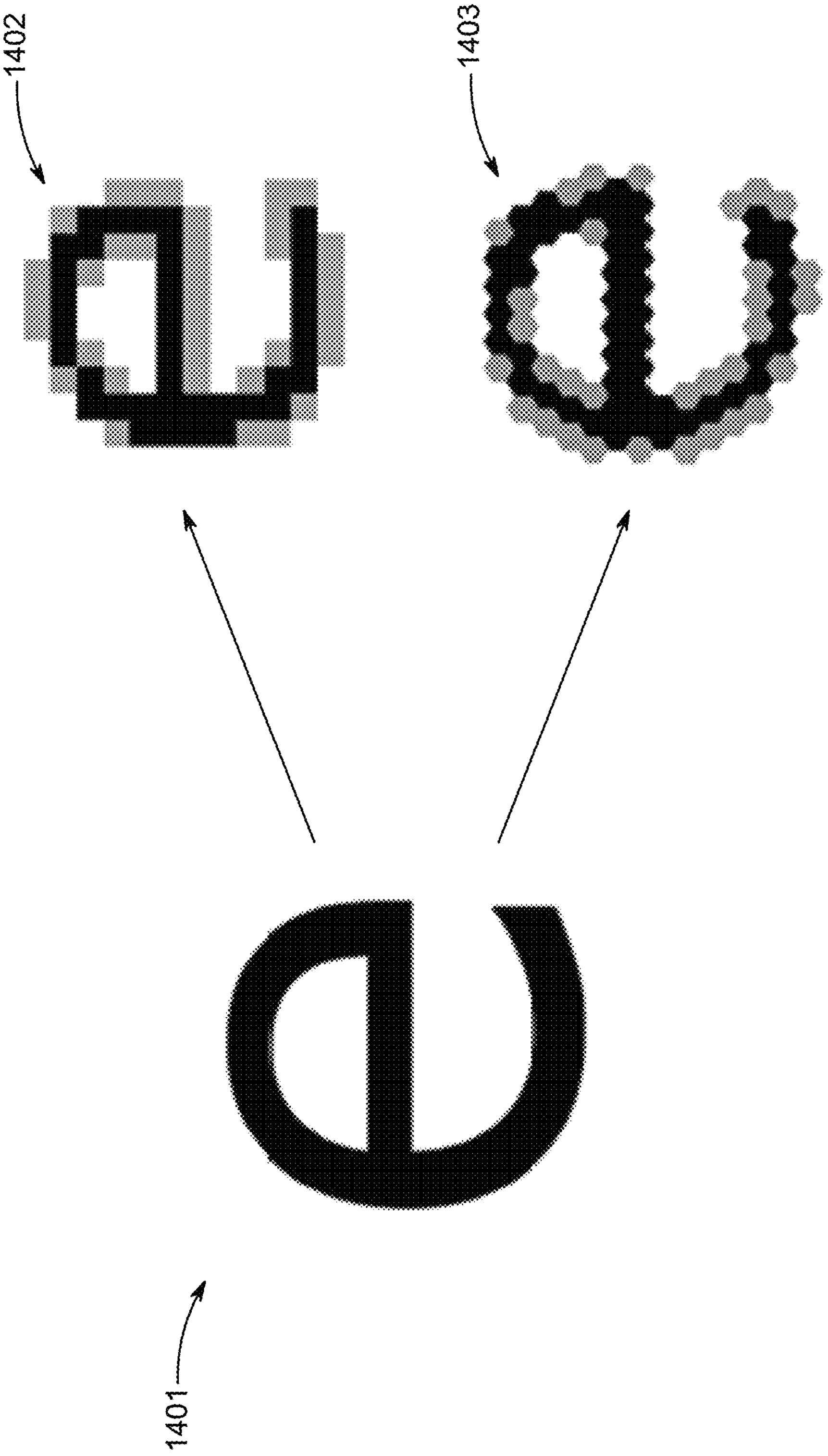
FIG. 14 demonstrates the effect of sampling a vector-based graphic onto a square and hexagonal grid.

Many image processing tools have been created for square and rectangular rasters. These methods have been explored for many decades and have been improved upon by various researchers and inventors over that time. A challenge with printing on alternative rasters such as a hexagonal raster is that image processing tools are scarce or completely absent. While it is feasible to convert a digital image rendered on a square raster to a digital image on a hexagonal raster (e.g., see Sousa 2014), doing so can reduce the benefits of using the hexagonal raster. For example, a hexagonal raster is well suited to creating smooth curved edges. FIG. 14 illustrates this advantage. A vector graphic is an image represented by a vector description rather than discrete pixels. Because of this, diagonal or curved edges are not encumbered by sampling onto a grid and so smooth curves are one characteristic of a vector graphic. For a digital printer, however, the vector graphic must be sampled onto a printing raster to be printed. Starting with a vector graphic 1401 of the letter "e" in FIG. 14, one can sample this vector graphic onto the square and hexagonal rasters (one of ordinary skill in the art to which the present applications will appreciate that while there may be minor aberrations in the letter "e" in FIG. 14A, that in reality vector files will have smooth surfaces even zoomed in based on the manner in which their geometry is defined. The represented sampling in FIG. 14 corresponds to printing a character of approximately 2-point font using a 600 dpi printing raster using 3-levels of grayscale. The sampling onto the square raster 1402 shows the blockiness representative of the cartesian sampling grid. The hexagonal raster sampling 1403 shows how the curves in vector graphic letter "e" are better represented. If the sampling had first been done onto the square grid (producing image 1402), converting this into a hexagonal raster would sacrifice the improved curve representation observed in image 1403. Therefore, it is desired to create image processing algorithms that operate on a hexagonal raster.

Figure 15:
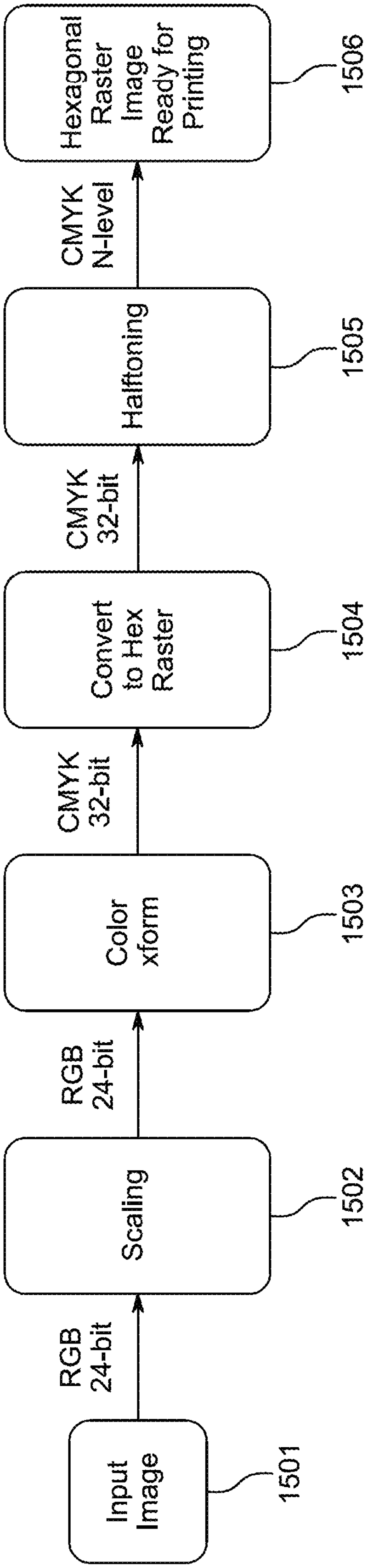
FIG. 15 shows an exemplary simple image pipeline for printing on a hexagonal raster.

FIG. 15 shows an exemplary and simple image pipeline for generating images appropriate for printing onto a hexagonal raster. While it may be desired to have an image processing pipeline that uses a hexagonal raster throughout the process as illustrated in FIG. 14, the fact is that most digital images today are already sampled onto a square pixel grid, meaning the pipeline proposed in FIG. 15 should start with an input image that is represented on a square raster to be most useful. This pipeline is characteristic of the prior art with three important differences. The final image 1506 is naturally different from the prior art as it represents a digital image sampled onto the hexagonal raster appropriate for printing in accordance with the present disclosure. Secondly, a conversion 1504 from the square raster to the hexagonal raster is performed following the color transformation step. It is beneficial that this conversion occurs before the halftoning step. This positioning of step 1504 also allows the image pipeline to use the well-established color management tools and systems created for square raster digital images to color transform the image in step 1503. Likewise, the scaling step 1502 is well established for square and rectangular rasters from an image input 1501 and those methods are used in the image pipeline of FIG. 15. The conversion 1504 can be performed through a variety of methods, some of which are enumerated by Sousa 2014. The third difference is the halftoning process step 1505 that operates on an image that has been sampled onto a hexagonal grid. The inventors are unaware of any tools currently available for such a process step and several embodiments for process step 1505 are now described.

The role of halftoning in digital printing is to take a high bit depth image (e.g., an image that has 8-bits or 256-levels for each channel) and reduce that bit depth to correspond with the number of levels the printing system is capable of producing. While some printing systems can produce high bit depth output (called contone printing processes), inkjet printing is typically restricted to only 1-, 2-, or 3-bit printing. The halftoning step is therefore a critical part of the image pipeline in preparing images for printing using an inkjet printer. For printing onto a hexagonal raster, converting an already halftoned square raster digital image to a hexagonal raster would likely create imaging artifacts and an unfaithful representation of the image. It is important therefore to convert to a hexagonal raster prior to the halftoning step and provide a halftoning algorithm that operates on the hexagonal raster.

There are multiple ways to halftone an image, but two methods are prevalent when preparing images for inkjet printing: stochastic dithering and error diffusion. Stochastic dithering compares the input image code value to a threshold value and selects an output level based on that comparison. Typically, the threshold values are represented in a separate matrix that is tiled across the image being halftoned. Often the threshold values in the matrix are created so as to vary according to a desired frequency content. For example, varying the threshold values at a frequency nominally greater than the frequency of variation of code values in the image is a common practice called blue-noise-dithering. The term "blue noise" will be used to define having frequencies of variation that are nominally greater than the frequency of variation of code values in the image. This approach can readily be applied for printing of a hexagonal raster. The threshold values are defined on a separate hexagonal raster that is tiled over the image (represented in a hexagonal raster) to be halftoned. The comparison between the threshold value and the image code value is performed as it is in the prior art to produce the output value.

Error diffusion is another common method to halftone a digital image for inkjet printing. In general, this method applies a filter to an image through convolution. The code value of the pixel in the image at the origin of the filter is discretized to one of the levels appropriate for printing. This discretization step often produces some error; i.e., after discretizing there is some amount of remainder, and this remainder is termed the error. For example, a 3-level output on an 8-bit scale could be one of 0, 127, or 255 values. If an input pixel has a value of 155, that pixel would be discretized to 127 (the closest of the three allowable output levels) and the error would be 155−127=28. The error diffusion filter (or kernel) then distributes that error of 28 to neighboring pixels. The coefficients in the error diffusion filter determine how much of the error each of the neighboring pixels receives.

Figure 16B:
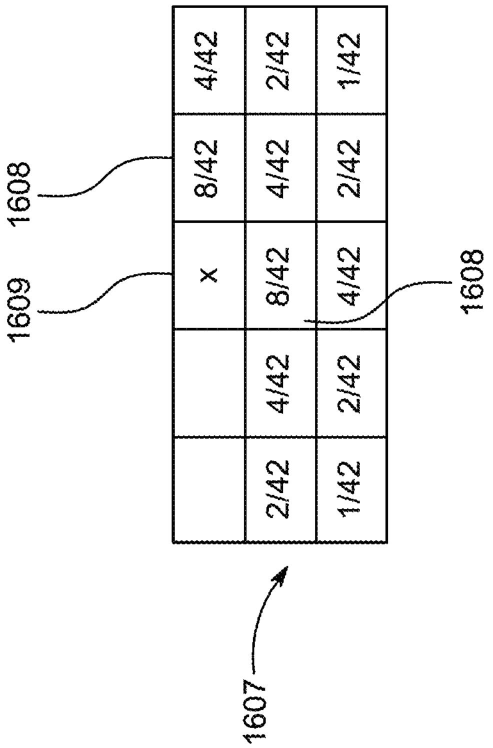
FIG. 16B PRIOR ART
FIGS. 16A-B present two typical error diffusion filter kernels used on a rectangular raster typical of the prior art.
Figure 16A:
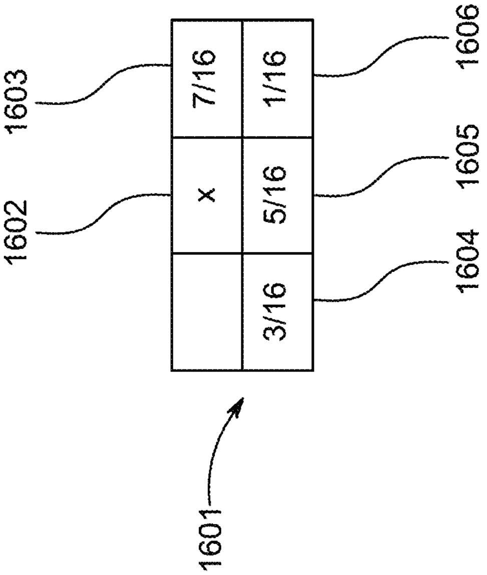
FIG. 16A PRIOR ART

A popular error diffusion filter is the Floyd-Steinberg filter 1601 shown in FIG. 16A. This filter has a filter origin 1602 along with filter coefficients 1603 and 1604, 1605 and 1606. The error upon discretizing the pixel at the filter origin is distributed according to the filter coefficients. The pixels neighboring the filter origin, filter coefficients 1603 and 1605, receive $12/16^{ths}$ of the discretization error. Filter coefficients 1604 and 1606 that only diagonally neighbor the filter origin receive just $4/16^{ths}$ of the discretized error. This is an important shortcoming of error diffusion on a square raster—the neighboring pixels are not equal and so the error must be distributed in a highly non-uniform fashion.

FIG. 16B shows another popular error diffusion filter, the Stucki filter 1607, that aims to distribute the discretized error more broadly and so is a larger filter. Here again, though, note how the two neighbors, filter coefficients 1608, that share an edge with the filter origin 1609 receive significantly more of the discretized error than the pixels that only share a corner with the filter origin.

Figure 17B:
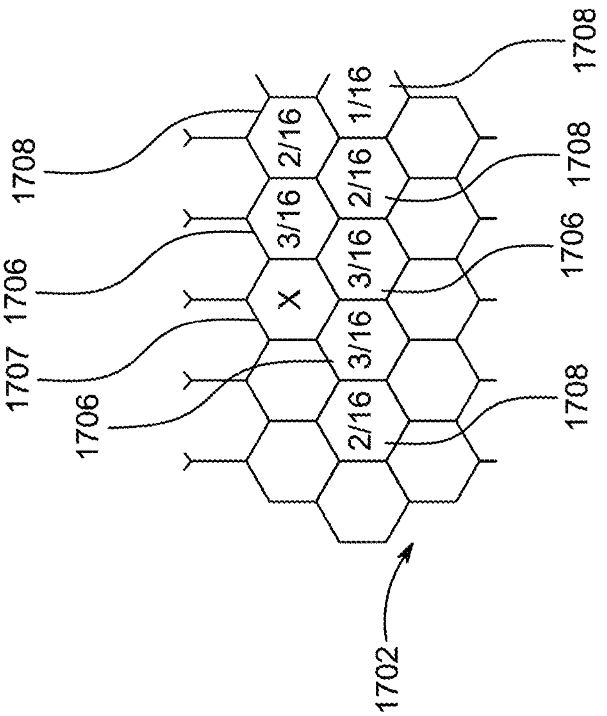
FIGS. 17A-E present five different error diffusion kernels for a hexagonal raster.
Figure 17A:
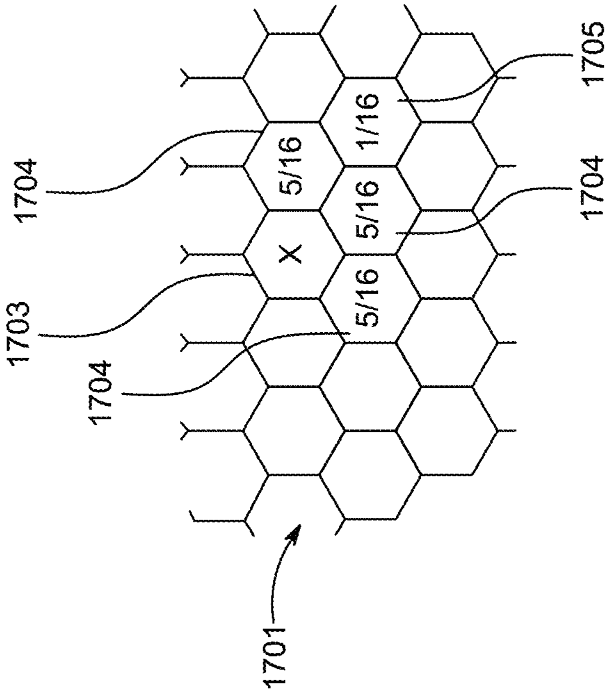
Figure 17D:
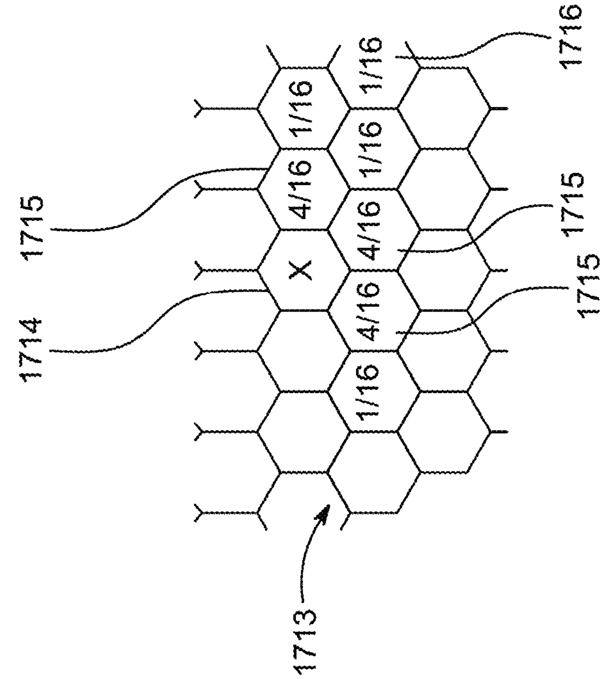
Figure 17C:
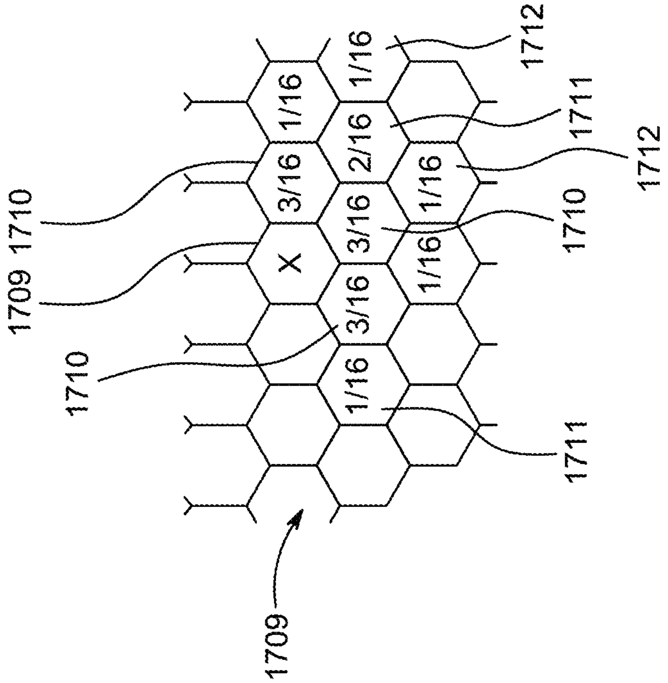
Figure 17E:
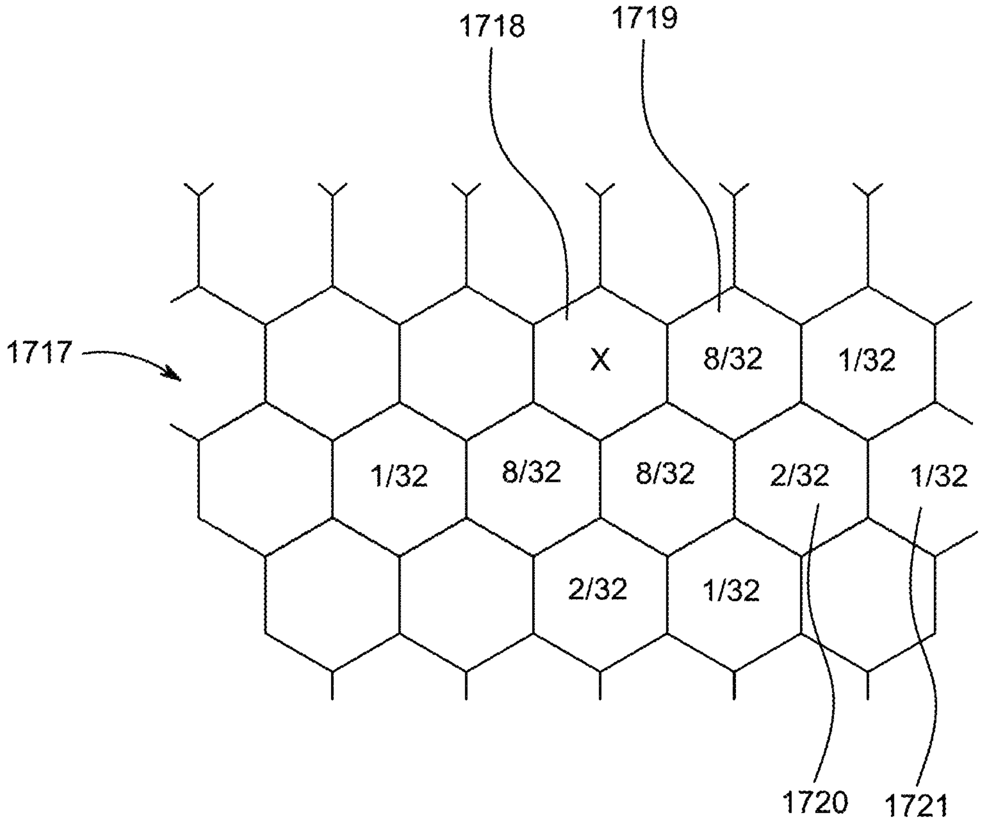

Because a pixel in a hexagonal raster has six equivalent neighbors, it is possible and desirable to distribute the discretized error approximately evenly to three of those neighbors. The convolution process precludes distributing the error to all six neighbors. FIGS. 17A-B show several examples of error diffusion filters for a hexagonal rasters 1701 and 1702. The hexagonal error diffusion filter shown in FIG. 17A is a simple example of this approach. The filter origin 1703 has around it filter coefficients 1704 of the three equivalent neighbors are equal and distribute nearly all the discretized error. Filter coefficient 1705 that is not a neighbor receives only $1/16^{th}$ of the error. A simple filter like this can lead to image artifacts such as "worming" so a slightly larger filter is proposed in FIG. 17B. Here the error is distributed farther in the x-direction. The filter coefficients 1706 belonging to the neighbors of the filter origin 1707 again each receive an equal amount of the discretized error and, in total, over half the discretized error. Non-neighboring filter coefficients 1708 distribute the error more broadly in the horizontal direction. The filter shown in FIG. 17C distributes the error more broadly in the vertical direction, helping to further break up worm artifacts. Once again, a filter origin 1709 has around it coefficients 1710 each receive an equal amount of a majority of the discretized error. Coefficients 1711 and 1712 receive are progressively lower as their proximity to the filter origin 1709 declines. FIGS. 17D and 17E show two further examples. For the sake of processing speed, it is often advantageous to use filter coefficients with divisors and numerators that are a power of two. This lends the filtering process mathematics to use simple bit shift operations to distribute the discretization error to the neighboring pixels. Filters 17D and 17E exemplify this approach while maintaining the advantages described above. With respect to FIG. 17D, raster 1713 has a filter origin 1714, having neighboring error distributions 1715 and 1716. With respect to FIG. 17E, raster 1717 has a filter origin 1718, having neighboring error distributions 1719, 1720 and 1721.

Halftoning an image represented on a hexagonal raster using the methods described above has been demonstrated to produce pleasing output that faithfully reproduces the original input image.

Figure 21:
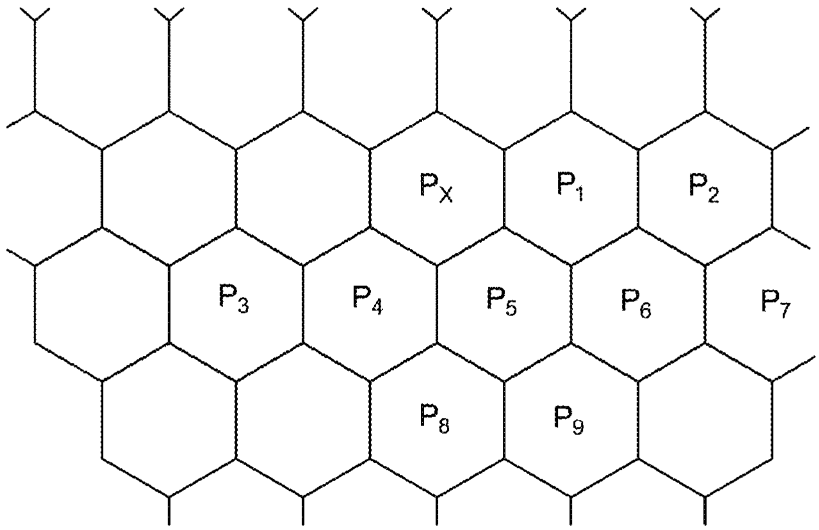
FIG. 21 depicts a manner of describing the error filters of a hexagonal raster.

FIG. 21 depicts, for the purposes of simplifying recitiation of the subject matter of the present disclosure, how an filter origin $P_x$ has around it distributed error values for adjacent pixels, labeled consecutively as $P_1$-$P_9$ from left to right and in subsequent rows.

While FIG. 14 illustrates the benefits of the hexagonal raster when printing curves and diagonal lines, a challenge is observed when printing either horizontal or vertical lines. As apparent in FIG. 10A, a hexagonal raster 1003 in the orientation shown in FIG. 10A cannot create a straight vertical line of pixels; rather, the vertical line will jog left and right by one-half a pixel width due to the packing nature of the hexagonal tessellation. There are several approaches to avoiding this detraction. First, one can observe that this limitation is only present in vertical lines for the hexagonal raster shown in FIG. 10A. Horizontal lines will be straight as they are for a square or rectangular raster. Preprocessing of the image to determine the preponderant direction of straight-line segments can guide the optimal orientation of the hexagonal raster. For example, the Hough transform is well suited for detecting line segments and their orientations. This algorithm can easily be extended to work on multichannel, high bit-depth ("contone") digital images. By so processing a pre-halftoned digital image, the dominant orientation of linear segments can easily be determined. As is well known in the art, utilizing the Hough transform in conjunction with various edge detection algorithms further permits the orientation of edges rather than just line segments. Once the dominant line and edge orientation is determined, the image processing process operates on this orientation of the raster and the print quality of the straight lines is preserved.

Figure 18A:
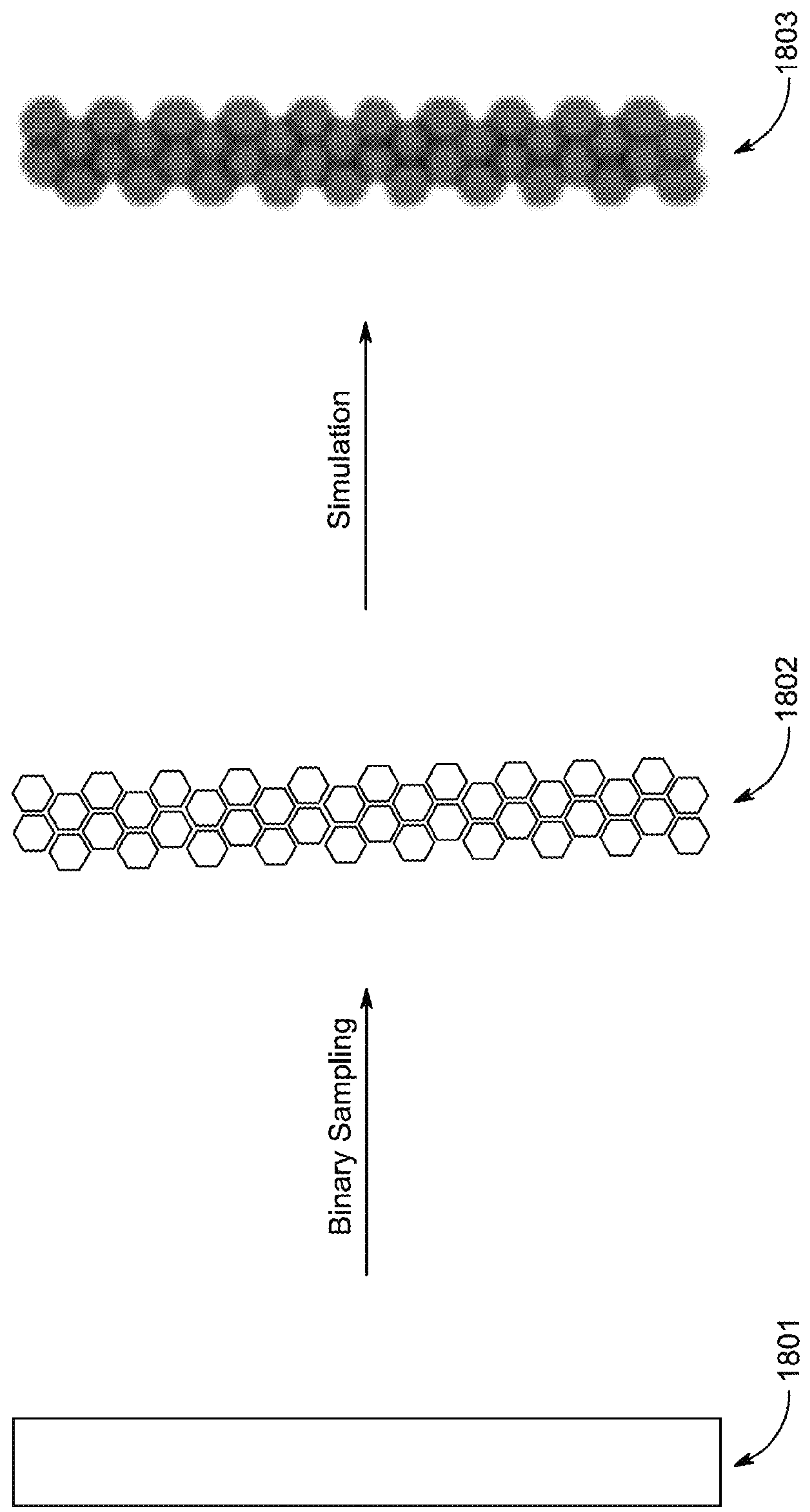
FIGS. 18A-B illustrate printing of a vertical line in a binary and grayscale print mode on an unrotated hexagonal raster.
Figure 18B:
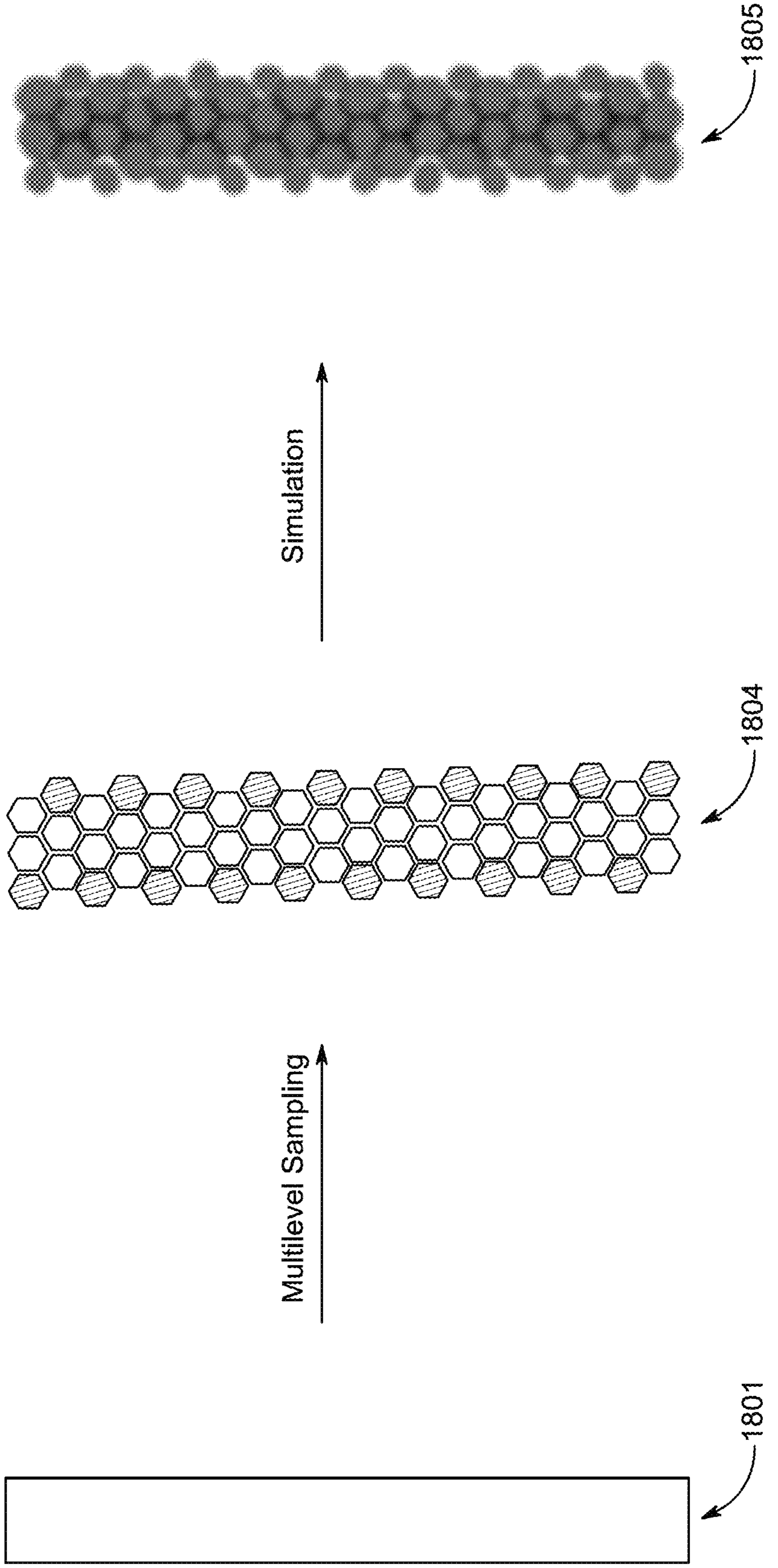

Alternatively, grayscale or multilevel printing can be used to lessen any deleterious effect on straight lines. Consider, for example, a two-pixel wide and 20-pixel tall vertical line 1801 shown in FIG. 18A. In this case, we shall assume rotating the hexagonal grid is not an option and the printer is only capable of binary printing. In this case, the input image 1801 when sampled onto the hexagonal grid 1802 contains only on-off pixels. The resulting simulated print 1803 shows the edges of the vertical line are not straight but jog left and right by one-half a pixel as expected based upon the sampled image 1802. Leveraging multilevel printing capabilities common in today's industrial printers can combat this issue. FIG. 18B illustrates one possibility. During the sampling process to convert the input image 1801 to the sampled image on the hexagonal raster 1804, three-level sampling is performed. This sampling will preferentially place the intermediate sized dots in the jogs observed in the sampled image 1802 of FIG. 18A to create the multilevel sampled image 1804 shown in FIG. 18B. When this is simulated using 3-level printing, the output 1805 illustrates the improvements in line quality that are possible through grayscale printing.

Figure 19:
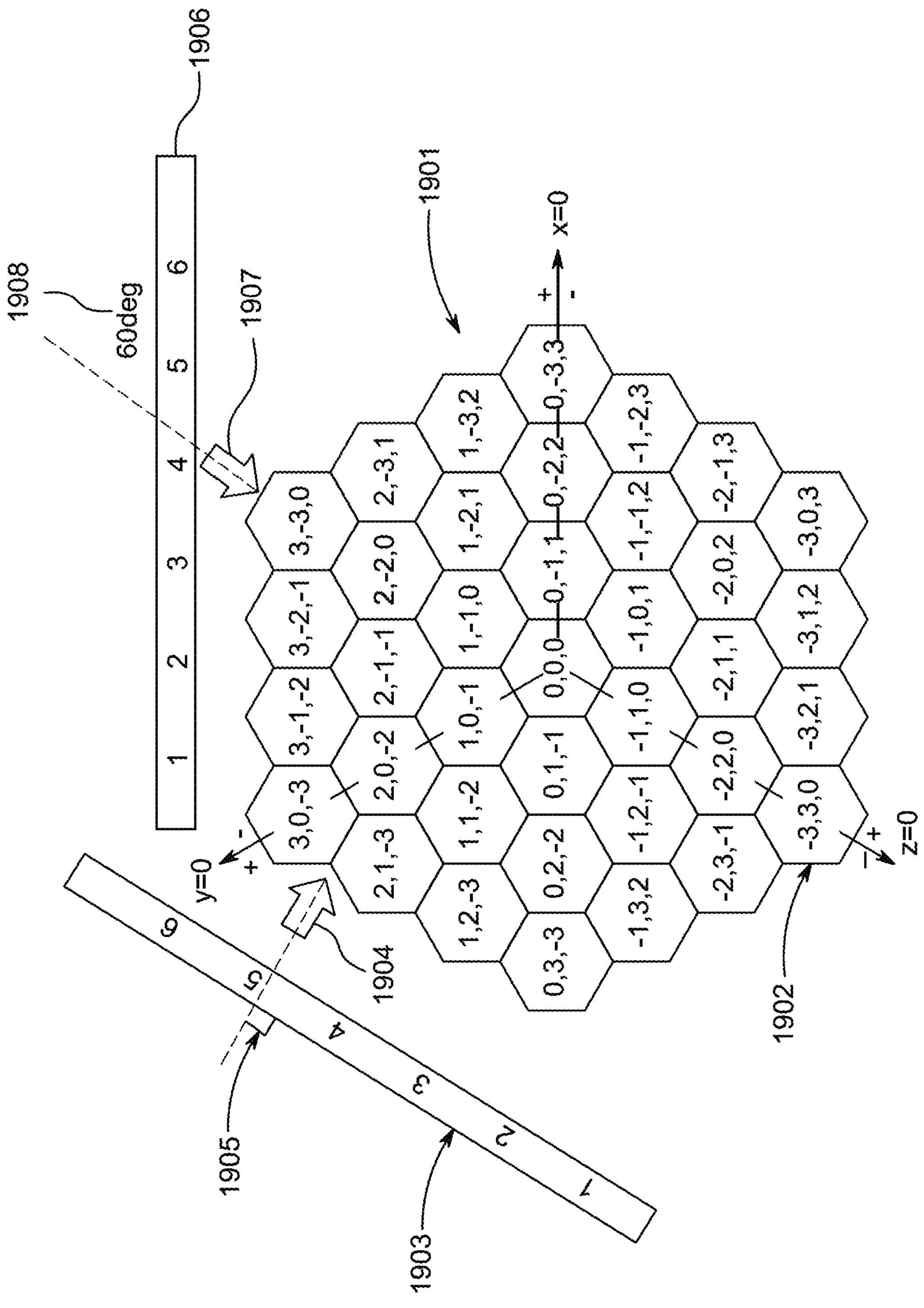
FIG. 19 depicts a hexagonal raster along with two different print directions, one of the print directions also employing a saber angle.

While the print methods described to this point offer a significant advantage over the prior methods, printing on a hexagonal raster offers even greater flexibility when employing the use of a saber angle. Up to this point, all print methods have considered the case where the primary axis of the printing unit (e.g., the long axis of an inkjet print head, for example, along which the nozzles within the print head are aligned) is perpendicular to the print direction. A saber angle is defined as a relative rotation of the print unit away from this perpendicular orientation. Consider for example in FIG. 19. Hexagonal print raster 1901 has raster coordinates represented by positions 1902. A first print pass can be made as described above with the print head angled as shown by print head orientation 1903 moving in direction 1904. As illustrated, this print head orientation and print direction make a 90-degree angle, 1905. In this case, the saber angle is zero and printing occurs as described above. Careful examination of 1903 and 1904 will place it in Group B of the print directions illustrated in FIG. 10A and described more fully above. A second print head orientation, 1906, is also shown in FIG. 19, along with a print direction 1907. Now the print direction makes a 60-degree angle, 1908 with the print head, meaning the saber angle is 30 degrees. Careful examination of print direction 1907 will place it in Group A of the print directions illustrated in FIG. 10A. Without implementing a saber angle, these two print directions could not be printed with a single print head of fixed resolution.

Figure 20:
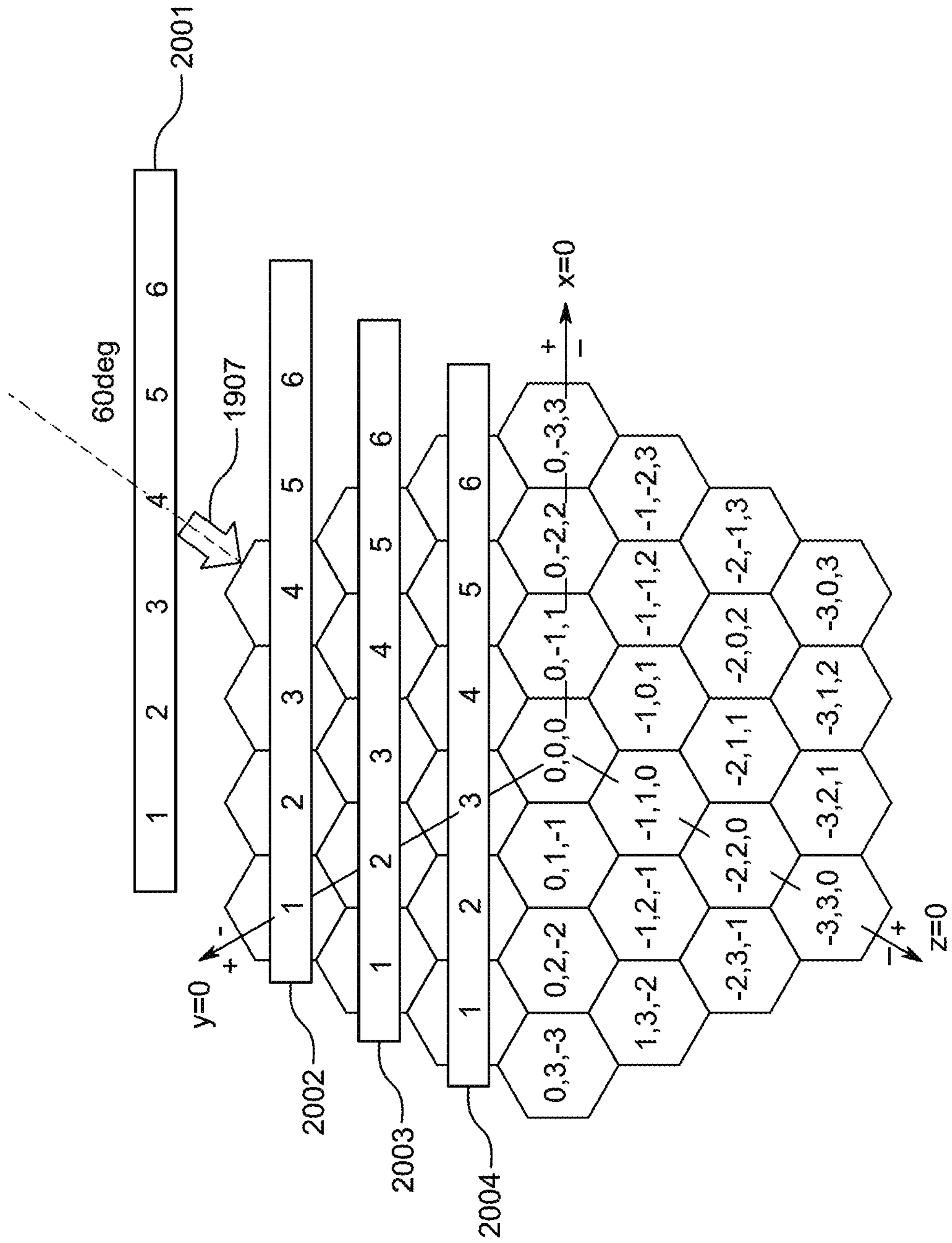
FIG. 20 depicts nozzle locations while printing onto a hexagonal raster while employing a saber angle.

As illustrated in FIG. 20, the hexagonal raster offers a critical advantage when a saber angle of +/−30 degrees is employed. Shown in FIG. 20 are the positions of the print head 2001 while executing a print pass consistent with the print direction 1907 shown in FIG. 19 and print head orientation 1906 shown in FIG. 19. First, the print head encounters the top row of pixels while in position 2002. As the print head continues along direction 1907, it moves to the second row of pixels while in position 2003, and then to the third row of pixels while in position 2004. As illustrated, the nozzles of the print head 2011 are nominally placed directly over the center of pixels in the raster of 1901.

By implementing a nonzero saber angle on at least some of the print passes, all twelve print directions shown in FIG. 10*a* may be printed with a single print head resolution. Furthermore, and consistent with the intent of the present disclosure, all print directions can enable high utilization of the print unit. The combination of a hexagonal raster, print direction, and saber angle enable the print raster to be approached from twelve different print directions in a highly efficient manner.

Figure 22:
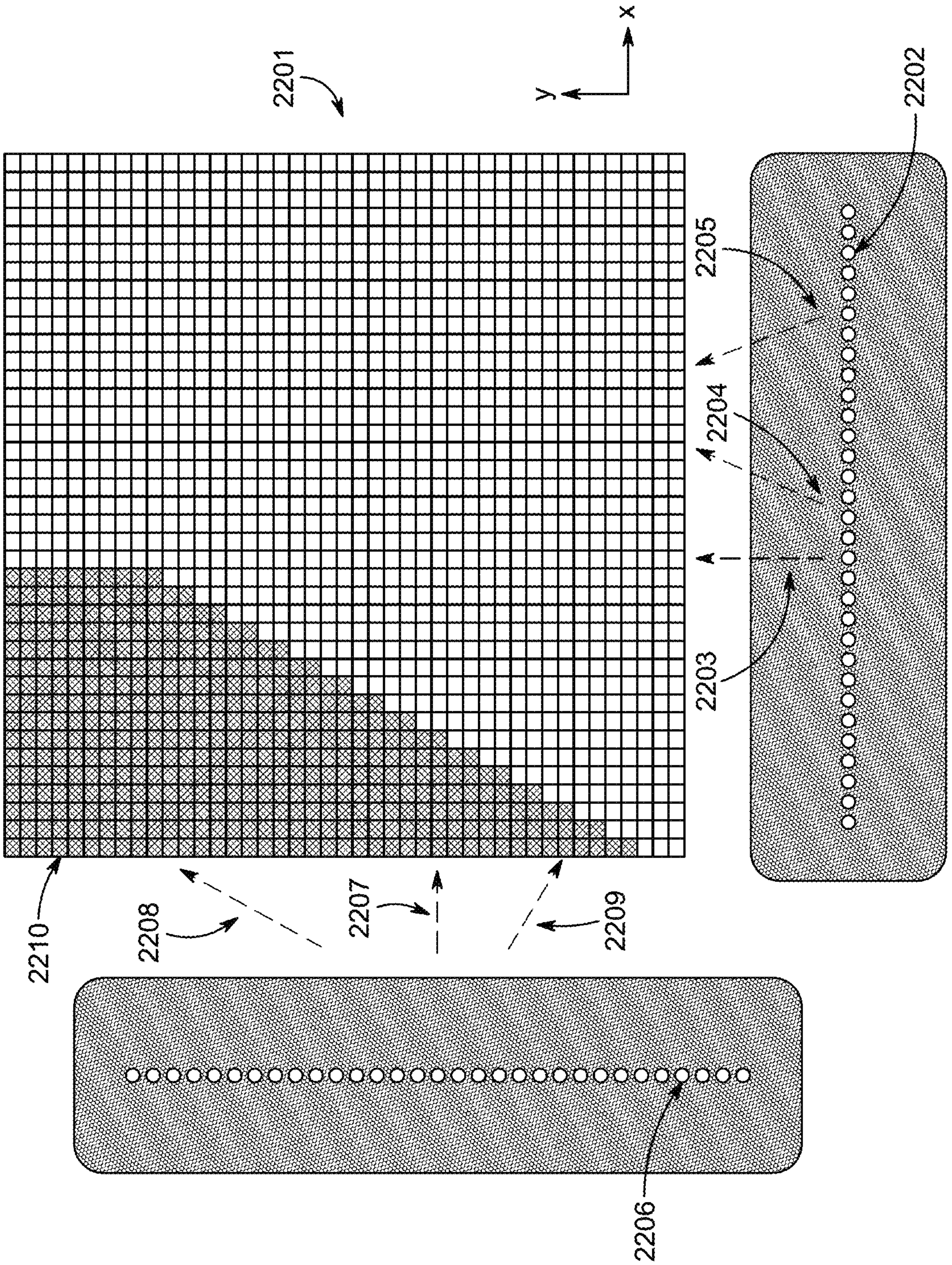
FIG. 22 depicts the printing onto a rectangular raster while employing a saber angle.

Close examination of the use of a saber angle shows that this approach can be beneficial for any regular tessellation grid, provided the nozzle array be rotated such that the array is parallel to one of the axes of the grid. With this nozzle array orientation, the array can be traversed across the print medium in a variety of directions while facilitating high nozzle usage and resulting high printing speed. This further permits multiple print directions, including directions that are nonparallel and nonorthogonal to each on tessellation grids other than hexagonal grids. FIG. 22 further illustrates this approach while printing on a rectangular grid. A square raster grid, 2201, is illustrated along with a nozzle array in two orientations, 2202 and 2206, where the nozzle array is oriented to be parallel to one of the axes of the grid. Orientation 2202 arranges the nozzle array to be parallel with the x-axis of the grid while orientation 2206 arranges the nozzle array to be parallel with the y-axis of the grid. In the prior art, the print head would be translated across the print medium in a direction substantially perpendicular to the nozzle array; i.e., for orientation 2202, the nozzle array would be translated in direction 2203 (and 180 degrees from 2203 for a bidirectional print mode) for the entire print. Likewise, in orientation 2206, the prior art would translate the nozzle array in direction 2207 (and 180 degrees from 2207 for a bidirectional print mode) for the entire print. Two other exemplary print directions, 2208 and 2209 are shown when the nozzle array is in orientation 2206. To further illustrate, the shaded region 2210 of grid 2201 could be printed with the nozzle array in orientation 2206 and translated in direction 2208. Note that directions 2208 and 2209 are not parallel nor orthogonal to each other or the typical print direction 2207. This enables better hiding of print defects as illustrated previously by affording the possibility of printing the raster in multiple different print directions. Likewise, print directions 2204 and 2205 are illustrated for the nozzle array in orientation 2202, taking note that all three exemplary print directions, 2202, 2204, and 2205 for orientation 2202 are all nonparallel and nonorthogonal.

It will be appreciated by those skilled in the art that the methods and devices of the present disclosure are not limited to the examples shown and discussed above. Rather, the scope of the present disclosure should be understood to include combinations of various features and elements described herein and variations thereof that would occur to a person ordinarily skilled in the art upon reading the foregoing description.

What is claimed:

1. A method of printing for improved image fidelity, comprising the steps of:

providing at least one printing unit configured to print at least one print material according to a set of print data;

providing a printing raster containing raster locations, each raster location associated with a portion of the print data, wherein the printing raster is represented by a hexagonal grid comprising a plurality of pixels, wherein a center of each pixel in the printing raster is equidistant to a center of each neighboring pixel;

conducting a first printing pass by moving the printing unit relative to a printing substrate in a first printing direction while printing at least one print material according to at least a portion of the print data; and conducting a second printing pass by moving the printing unit relative to the printing substrate in a second printing direction while printing the at least one print material according to at least a portion of the print data;

wherein the first printing direction and the second printing direction are disposed at a non-orthogonal differential angle other than 180 degrees; and wherein the printing raster, the first printing direction and the second printing direction are together selected such that at least 25% of the raster locations defined in the printing raster are capable of being printed by the printing unit during each of the first printing pass and the second printing pass.

2. The method of claim 1 wherein a spacing between the raster locations in a direction perpendicular to the relative motion created during the first printing pass is substantially equal to a spacing between the raster locations in a direction perpendicular to the relative motion created during the second printing pass.

3. The method of claim 1 wherein the differential angle between the two printing directions is an integer multiple of 60 degrees.

4. The method of claim 1 wherein the at least one print material is a plurality of print materials and wherein at least a portion of the different print materials are printed by separate print units.

5. The method of claim 1 wherein the at least one print unit is a plurality of print units that print the same print material.

6. The method according to claim 1 wherein the first printing pass and the second printing pass overlap each other and at least a portion of the print data is printed during the first printing pass and at least a portion of the print data is printed during the second printing pass.

7. The method according to claim 1 wherein said printing is performed in a multi-pass printing mode wherein at least a portion of the substrate receives ink in at least two different printing passes using substantially the same printing direction.

8. The method of claim 1 further comprising the steps of:

conducting a third printing pass by moving the printing unit relative to the printing substrate in a third printing direction while printing the at least one print material according to at least a portion of the print data;

wherein the third printing direction is nonparallel to the first printing direction and the second printing direction; and wherein first printing direction, the second printing direction and the third printing direction are angled relative to one another by an integer that is a multiple of 60 degrees.

9. The method according to claim 1 wherein the print unit is transported to the print substrate and the print substrate remains static following the first printing pass and the second printing pass.

10. A method of printing for improved image fidelity, comprising the steps of:

providing at least one printing unit configured to print at least one print material according to a set of print data;

providing a printing raster containing raster locations, each raster location associated with a portion of the print data, wherein the printing raster is represented by a hexagonal grid comprising a plurality of pixels, wherein a center of each pixel in the printing raster is equidistant to a center of each neighboring pixel;

conducting a first printing pass by moving the printing unit relative to a printing substrate in a first printing direction while printing at least one print material according to at least a portion of the print data; and conducting a second printing pass by moving the printing unit relative to the printing substrate in a second printing direction while printing the at least one print material according to at least a portion of the print data;

wherein the first printing direction and the second printing direction are disposed at a non-orthogonal and nonparallel angle;

wherein the printing raster, the first direction and the second printing direction are together selected such that at least 25% of the raster locations defined in the printing raster are capable of being printed by the printing unit during each of the first printing pass and the second printing pass; and wherein the first printing pass and the second printing pass are conducted with the nozzle array arranged to be substantially parallel to an axis of the print raster.

* * * * *